US008423555B2

(12) United States Patent
Ambwani et al.

(10) Patent No.: US 8,423,555 B2
(45) Date of Patent: Apr. 16, 2013

(54) AUTOMATIC SEGMENTATION OF VIDEO

(75) Inventors: Geetu Ambwani, Washington, DC (US);
Anthony R. Davis, Silver Spring, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 103 days.

(21) Appl. No.: 12/833,486

(22) Filed: Jul. 9, 2010

(65) Prior Publication Data
US 2012/0011109 A1   Jan. 12, 2012

(51) Int. Cl.
*G06F 7/00* (2006.01)
*G06F 17/30* (2006.01)

(52) U.S. Cl.
USPC ............ 707/746; 707/771; 707/780; 707/913

(58) Field of Classification Search .................. 707/711, 707/741, 746, 771, 780, 913
See application file for complete search history.

(56) References Cited

U.S. PATENT DOCUMENTS

| | | | |
|---|---|---|---|
| 4,227,177 A | 10/1980 | Moshier | |
| 5,493,677 A | 2/1996 | Balogh et al. | |
| 5,521,841 A | 5/1996 | Arman et al. | |
| 5,530,859 A | 6/1996 | Tobias, II et al. | |
| 5,535,063 A | 7/1996 | Lamming | |
| 5,553,281 A | 9/1996 | Brown et al. | |
| 5,594,897 A | 1/1997 | Goffman | |
| 5,640,553 A | 6/1997 | Schultz | |
| 5,649,182 A | 7/1997 | Reitz | |
| 5,664,227 A * | 9/1997 | Mauldin et al. | 715/203 |
| 5,682,326 A | 10/1997 | Klingler et al. | |
| 5,717,914 A | 2/1998 | Husick et al. | |
| 5,729,741 A | 3/1998 | Liaguno et al. | |
| 5,737,495 A | 4/1998 | Adams et al. | |
| 5,737,734 A | 4/1998 | Schultz | |
| 5,742,816 A | 4/1998 | Barr et al. | |
| 5,761,655 A | 6/1998 | Hoffman | |
| 5,765,150 A | 6/1998 | Burrows | |
| 5,799,315 A | 8/1998 | Rainey et al. | |
| 5,835,667 A * | 11/1998 | Wactlar et al. | 386/241 |
| 5,845,279 A | 12/1998 | Garofalakis et al. | |
| 5,857,200 A | 1/1999 | Togawa | |

(Continued)

FOREIGN PATENT DOCUMENTS

WO   96/12239   4/1996
WO   0205135    1/2002

OTHER PUBLICATIONS

Zhu Liu and Yao Wang, Audio Feature Extraction and Analysis for Scene Segmentation and Classification, Journal of VLSI Signal Processing, published 1998.*
European Search Report dated Oct. 6, 2011.
Communication in EP 01 950 739.1 - 1244 dated Feb. 21, 2011.

(Continued)

*Primary Examiner* — Jeffrey A Burke
(74) *Attorney, Agent, or Firm* — Banner & Witcoff, Ltd.

(57) ABSTRACT

Content items may be segmented and labeled by topic to provide for the capture, analysis, indexing, retrieval and/or distribution of information within information rich media, such as audio or video, with greater functionality, accuracy and speed. The segments and other related information may be stored in a database and made accessible to users through, for example, a search service and/or an on-demand service. Automatic segmentation may include receiving a text representation, calculating relevance intervals based on the text representation, determining a nodal representation based on the relevance intervals, and determining segments of the content item based on the nodal representation.

18 Claims, 14 Drawing Sheets

U.S. PATENT DOCUMENTS

| | | | |
|---|---|---|---|
| 5,924,090 | A | 7/1999 | Krellenstein |
| 5,928,330 | A | 7/1999 | Goetz et al. |
| 5,956,729 | A | 9/1999 | Goetz et al. |
| 5,982,369 | A | 11/1999 | Sciammarella |
| 6,055,543 | A | 4/2000 | Christensen et al. |
| 6,320,588 | B1 | 11/2001 | Palmer et al. |
| 6,345,253 | B1 | 2/2002 | Viswanathan |
| 6,363,380 | B1 | 3/2002 | Dimitrova |
| 6,366,296 | B1 | 4/2002 | Boreczky et al. |
| 6,374,260 | B1 | 4/2002 | Hoffert et al. |
| 6,463,444 | B1 | 10/2002 | Jain et al. |
| 6,567,980 | B1 | 5/2003 | Jain et al. |
| 6,675,174 | B1 | 1/2004 | Bolle et al. |
| 6,877,134 | B1 | 4/2005 | Fuller et al. |
| 6,882,793 | B1 | 4/2005 | Fu et al. |
| 6,928,407 | B2* | 8/2005 | Ponceleon et al. ............ 704/253 |
| 6,937,766 | B1 | 8/2005 | Wilf et al. |
| 7,206,303 | B2 | 4/2007 | Karas et al. |
| 7,376,893 | B2* | 5/2008 | Chen et al. .................... 715/254 |
| 7,382,933 | B2* | 6/2008 | Dorai et al. ................... 382/276 |
| 7,466,334 | B1* | 12/2008 | Baba ......................... 348/14.06 |
| 7,490,092 | B2* | 2/2009 | Sibley et al. .......................... 1/1 |
| 7,769,761 | B2* | 8/2010 | Yoshimura .................... 707/738 |
| 8,121,432 | B2* | 2/2012 | Dorai et al. ................... 382/276 |
| 2001/0014891 | A1 | 8/2001 | Hoffert et al. |
| 2002/0002564 | A1 | 1/2002 | Munetsugu et al. |
| 2003/0093790 | A1 | 5/2003 | Logan et al. |
| 2003/0163815 | A1 | 8/2003 | Begeja et al. |
| 2003/0218696 | A1* | 11/2003 | Bagga et al. .................. 348/700 |
| 2004/0117725 | A1* | 6/2004 | Chen et al. .................... 715/500 |
| 2005/0216443 | A1* | 9/2005 | Morton et al. ..................... 707/3 |
| 2006/0253780 | A1 | 11/2006 | Munetsugu et al. |
| 2007/0055695 | A1 | 3/2007 | Dorai et al. |
| 2007/0185857 | A1* | 8/2007 | Kienzle et al. ..................... 707/5 |
| 2007/0211762 | A1 | 9/2007 | Song et al. |
| 2007/0214123 | A1 | 9/2007 | Messer et al. |
| 2007/0214488 | A1 | 9/2007 | Nguyen et al. |
| 2007/0260700 | A1 | 11/2007 | Messer |
| 2008/0066136 | A1* | 3/2008 | Dorai et al. ................... 725/135 |
| 2008/0133504 | A1 | 6/2008 | Messer et al. |
| 2008/0175556 | A1* | 7/2008 | Dorai et al. ...................... 386/52 |
| 2008/0183681 | A1 | 7/2008 | Messer et al. |
| 2008/0183698 | A1 | 7/2008 | Messer et al. |
| 2008/0204595 | A1 | 8/2008 | Rathod et al. |
| 2008/0208796 | A1 | 8/2008 | Messer et al. |
| 2008/0208839 | A1 | 8/2008 | Sheshagiri et al. |
| 2008/0221989 | A1 | 9/2008 | Messer et al. |
| 2008/0235209 | A1 | 9/2008 | Rathod et al. |
| 2008/0235393 | A1 | 9/2008 | Kunjithapatham et al. |
| 2008/0250010 | A1 | 10/2008 | Rathod et al. |
| 2008/0256097 | A1 | 10/2008 | Messer et al. |
| 2008/0266449 | A1 | 10/2008 | Rathod et al. |
| 2008/0288641 | A1 | 11/2008 | Messer et al. |
| 2009/0067719 | A1* | 3/2009 | Sridhar et al. ................ 382/176 |
| 2009/0125534 | A1 | 5/2009 | Morton et al. |
| 2009/0292685 | A1 | 11/2009 | Liu et al. |
| 2010/0278428 | A1* | 11/2010 | Terao et al. ................... 382/177 |

OTHER PUBLICATIONS

U.S. Appl. No. 12/349,934 - Office Action mailed May 10, 2011.
International Preliminary Examination Report for PCT/US01/20894, dated Feb. 4, 2002.
Towards a Multimedia World-Web Information retrievel engine, Sougata Mukherjea, Kyoji Hirata, and Yoshinori Hara Computer Networks and ISDN Systems 29 (1997) 1181-1191.
An Image and Video Search Engine for the World-Wide Web, John R. Smith and Shih-Fu Chang, Department of Electrical Engineering and Center for Image Technology for New Media Columbia University, New York, NY 10027, pp. 84-95, jrsmith.sfchang@itnm.columbia. edu., published 1997.
Experiments in Spoken Document Retrieval at CMU, M.A. Siegler, M.J. Wittbrock, S.T. Slattery, K. Seymore, R.E. Jones, and A.G. Hauptmann, School of Computer Science Carnegie Mellon University, Pittsburgh, PA 15213-3890, Justsystem Pittsburgh Research Center, 4616 Henry Street, Pittsburgh, PA 15213.
Eberman, et al., "Indexing Multimedia for the Internet", Compaq, Cambridge Research Laboratory, Mar. 1999, pp. 1-8 and Abstract.
Shaharay: "Impact and Applications of Video Content Analysis and Coding in the Internet and Telecommunications", AT&T Labs Research, A Position Statement for Panel 4: Applications the 1998 International Workshop on Very Low Bitrate Video Coding, 3 pages, Dated 1998.
Ishitan, et al., "Logical Structure Analysis of Document Images Based on Emergent Computation", IEEE Publication, pp. 189-192, Jul. 1999.
Chen, "Extraction of Indicative Summary Sentences from Imaged Documents", IEEE publication, 1997, pp. 227-232.
First Office Action in EP01950739.1-1244 dated Mar. 27, 2009.
Messer, Alan et al., "SeeNSearch: A Context Directed Search Facilitator for Home Entertainment Devices", Paper, Samsung Information Systems America Inc., San Jose, CA.
Kontothoanassis, Ledonias et al., "Design, Implementation, and Analysis of a Multimedia Indexing and Delivery Server", Technical Report Series, Aug. 1999, Cambridge Research Laboratory.
Smith, J.R. et al. "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.
U.S. Appl. No. 12/349,934 - Notice of Allowance dated Nov. 7, 2011.

* cited by examiner

AUTOMATIC SEGMENTATION OF VIDEO

TECHNICAL FIELD

Aspects of the disclosure relate to processing media files. In particular, one or more aspects relate to the identification of segments in a media file according to determined topics.

BACKGROUND

As contemporary communication technologies, such as the Internet, and interactive technologies, such as a video-on-demand service, increasingly rely on more information-rich types of media to enhance their popularity and/or capabilities, there is an increasing need to capture, analyze, segment, index, retrieve, and distribute the massive amount of information contained within the types of media available within these technologies. However, due to the massive amount of information within such media (e.g., an audio file or video file), traditional search techniques that are used to capture, analyze, segment, index, retrieve and/or distribute information from a static document may be less than optimal when applied to these types of media. Therefore, the processing of certain types of information-rich media files is often performed using manual judgments and determinations. For example, relevant segments of a video stream may be manually identified within a video (e.g., label a segment of video according to a manually identified topic of the segment). Additionally or alternatively, the beginning and end of different segments of a video may be manually identified.

Thus, there remains an ever-present need to provide for the capture, analysis, segmentation, indexing, retrieval and distribution of information related to media with greater functionality, accuracy and speed.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

In some embodiments herein, a content supplier or service provider may utilize a plurality of computing devices to allow the segmentation and distribution of the segmented content items to user devices. The plurality of computing devices may include a content database, a relevance interval database, a segment database, a content server, a data analysis server, a relevance interval calculation server, a segment calculation server, a distribution server, and a server network that provides communication between the various databases and servers of the content supplier. The segments of the content items may be labeled by topic and then later retrieved, organized by topic, and transmitted to a user device for consumption by a user.

In some embodiments, the computing devices of the content supplier may be configured to perform the method of segmenting one or more content items according to topics. For example, segmenting a content item may include processing and/or analyzing a text representation of the content item. A text representation may include one or more sentences, with each sentence including one or more terms. Upon receiving a text representation of the content item, relevance intervals may be calculated for the text. In some arrangements, a relevance interval may identify one or more sections of a content item that are deemed relevant to a particular set of terms of the text representation. Subsequent to calculating the relevance intervals, a nodal representation may be determined based on the relevance intervals. Then, based on the nodal representation, the segments for the content item may be determined. In some arrangements, these segments may be labeled by a determined topic.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Some embodiments may be described in the context of a network providing content and/or services to user devices over specific distribution networks using one or more protocols. The present disclosure is not limited to networks using a specific type of communication medium or to a specific set of communication protocols.

Figure 1:
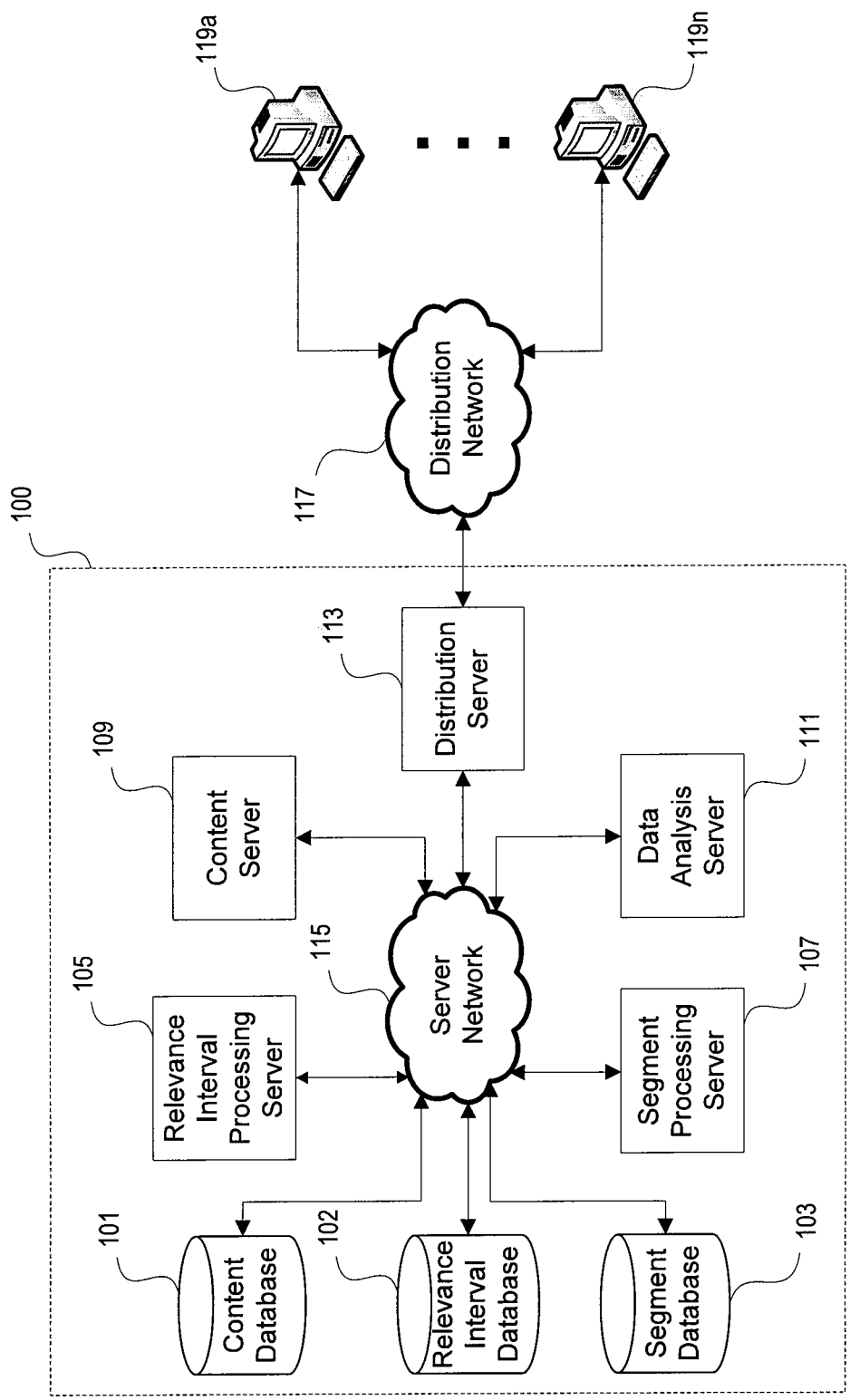
FIG. 1 is a block diagram showing an illustrative system in which content items may be segmented and distributed to users.

FIG. 1 is a block diagram showing an illustrative system in which content items may be segmented and distributed to users. In the embodiment illustrated in FIG. 1, content supplier 100 provides content items. Content items may take various forms, including items having video (e.g., a video program), audio (e.g., an audio file), text, data, and/or animations (e.g., Adobe® Flash files). Content supplier 100 may also provide services related to the content items (e.g., video-on-demand, Internet services, etc.) to one or more users. According to aspects of this disclosure, content supplier 100 may distribute to the user devices the content items, segments of the content items (e.g., portions of a television program, chapters in a story or movie, etc.) and/or services using the content items and/or the segments. Content supplier 100 may provide the segments of the content items with labels and/or topics (e.g., topic names for different stories in this week's episode of the "60 Minutes" news program). Segments of content items having associated labels and/or topics can be used in various manners by the content supplier 100 to provide users with more interactive and/or information rich services related to information-rich media, such as audio or video. For example, in some arrangements, content supplier 100 may store a searchable index of segmented content. The index may label each segment according to one or more topics. Content supplier 100 may receive a request from a user for segments of content items matching a topic (e.g., a user wishes to see all segments matching a particular sports team). In response, the content supplier 100 may retrieve one or more matching segments (e.g., all segments having a label matching and/or including the particular sports team) and transmit the results in a desired format, such as a video stream, or a list of results (e.g., web page, electronic program guide menu display, etc.). Additionally or alternatively, the segments may be transmitted as part of a video-on-demand service, or other service.

In other arrangements, content supplier 100 may organize one or more content streams (e.g., video channels or services, datastreams, etc.) according to particular labels and/or topics and transmit the organized segments over the corresponding content stream. In yet other arrangements, content supplier 100 may allow a user to receive recommendations of topically similar content items and/or segments. In some instances, the recommendations may be based on a particular content item and/or segment, such as a content item or segment currently being viewed by a user.

To provide the segmented content to the user devices, content supplier 100 may be configured to capture, analyze, segment, index, store, and/or retrieve segments of the content items. To accomplish this, content supplier 100 may use various databases and servers to provide the desired functionality. For example, in the illustrated embodiment of FIG. 1, content supplier 100 may have a content database 101, relevance interval database 102, segment database 103, content server 109, data analysis server 111, relevance interval processing server 105, segment processing server 107, distribution server 113, and a server network 115 that provides communication between the various databases and servers of the content supplier 100.

Content database 101 may include a plurality of content items and other data associated with a service of content supplier 100. A content item may include audio and/or video content and may be associated with particular programs, media files, or other content files. For example, a content item may be one or more video and/or audio files associated with a particular television show, movie, commercial, sporting event, news report, public service announcements and the like, because the item may include content for that show, movie, commercial, etc. The content server 109 may be configured to perform various tasks related to the content and/or services of the content supplier 100, including the tasks of receiving content items, storing content items in the content database 101, receiving requests associated with content or services via distribution server 113, retrieving content and/or data associated with a service from the content database 101, and transmitting the content and/or other data to the distribution server 113.

Data analysis server 111 may be configured to perform specific functions related to the analysis of content items, including data extraction (e.g., speech recognition, optical character recognition, image processing algorithms, etc.) and analysis of the extracted data (e.g., natural language processing, logical structure analysis, anaphora resolution, etc.). Results of the data extraction and/or analysis may be stored in the content database 101. In some embodiments, content database 101 may include text from the content items, such as textual scripts, closed captioning data, and the like. In some instances, the text may include data extracted and/or generated by the data analysis server 111.

Relevance interval processing server 105 may be configured to analyze the individual terms and/or phrases from the content's text or audio portion, and identify relevance intervals for the various terms and phrases in that text. A relevance interval may identify one or more sections of a content item (e.g., sectioned by time within the content, lines of dialog within the transcript, etc.) that are deemed relevant to a particular set of terms of the text or audio portion. Relevance intervals, and a method of calculating relevance intervals, will be discussed in detail below. The calculated relevance intervals may be stored in relevance interval database 102.

Segment processing server 107 may be configured to analyze the content text or audio and the relevance intervals identified by the relevance interval processing server 105, and identify and determine topical segments within the content items. Segment processing server 107 may also otherwise process the segments and store information related to the segments in one or more of the databases, including segment database 103. For example, segment processing server 107 may determine a topic for each segment of a content item, associate the topic with the respective segment, and store the topics and the associations in segment database 103. In one example, segment processing server 107 may analyze a content item for a news broadcast and identify the topical portions of the broadcast (e.g., a first segment about a neighborhood fire, a second segment about a local sports team, a third segment about a weather forecast, etc.) to define segments of the news broadcast corresponding to the different topics. The segment database 103 may store pointers or other indicators of the segments, including indicators of where a segment begins, what the topics discuss, etc. Various manners in which a segment is identified and/or determined, as well as various methods of processing the segments, are discussed in detail below.

Distribution server 113 may process communication between the content supplier 100 and one or more user devices 119a-119n. As illustrated in FIG. 1, distribution server 113 may transmit information via the distribution network 117 to the user devices 119a-119n. Distribution server 113 may also receive information from the user devices 119a-119n via the distribution network 117. User devices 119a-119n may be a heterogeneous mix of various devices including, for example, display devices (e.g., televisions), network gateways, personal computers, web-enabled cellular phones, personal digital assistants, laptop computers, television set-top boxes, digital video recorders, etc.

Distribution network 117 may be any type of network, such as satellite, telephone, cellular, wireless, Ethernet, twisted pair, fiber, coaxial, a hybrid network (e.g., a coaxial/fiber network), etc. In some embodiments, the distribution network may include components not illustrated, such as modems, bridges, routers, splitters, filters, amplifiers, wireless access points, Bluetooth® devices, and other connectors of various formats (e.g., HDMI, Multimedia over Coax Alliance, etc.) to assist in conveying the signals to their destination. Accordingly, distribution server 113 may be configured to manage communications between various types of devices on the distribution network 117 and other devices of the content supplier 100. For example, in a coaxial cable or hybrid fiber/coax system, the distribution server 113 or network 117 may include a termination system, such as a cable modem termination system (CMTS). The CMTS may be as specified in the Data Over cable Service Interface Specification (DOCSIS) standard, published by Cable Television Laboratories, Inc. (a.k.a. CableLabs), or it may be a similar or modified device instead. The termination system may be configured to place data on one or more downstream frequencies to be received by modems, such as cable modems, at the premises of the user devices 119a-119n, and to receive upstream communications from one or more modems on one or more upstream frequencies. Similar types of distribution servers may be used for other types of distribution networks, such as an optical fiber termination system for optical media, telephone line DSLAM (Digital Subscriber Line Access Multiplexer) for telephone lines, satellite transceivers, cellular telephone stations, local area wireless (e.g., WiMax), etc.

Figure 2:
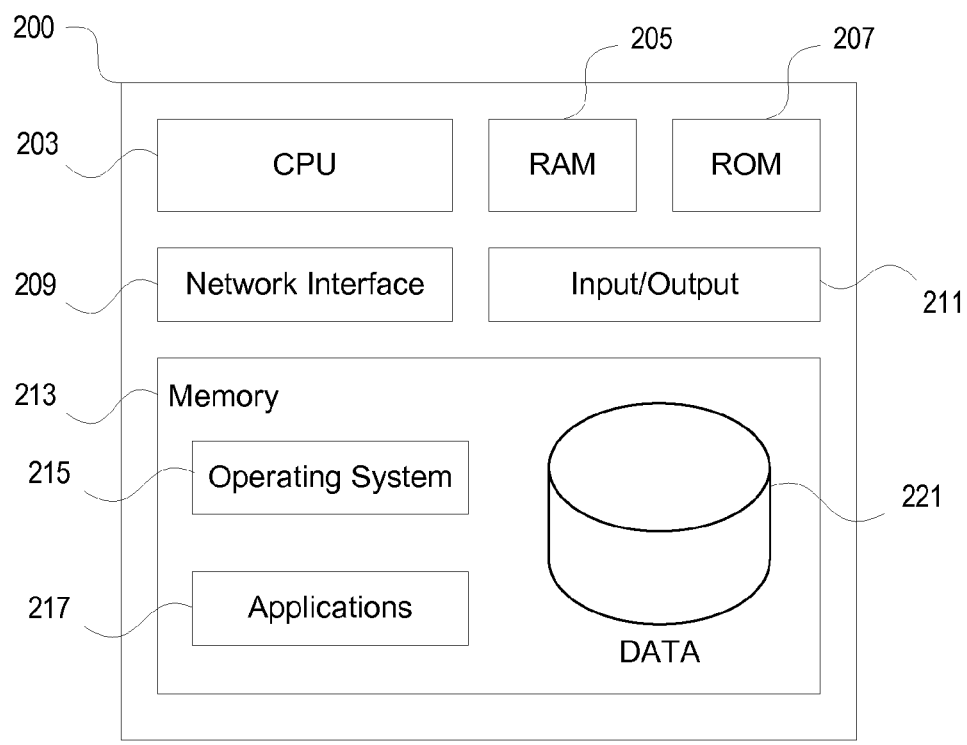
FIG. 2 illustrates a computing device that may be used to implement various methods and devices described herein.

FIG. 2 illustrates a computing device that may be used to implement various methods and devices described herein (e.g., the various servers, user devices, and/or databases of FIG. 1). The computing device 200 may include one or more processors 203, which may execute instructions of a computer program to perform any of the features described herein. Those instructions may be stored in any type of computer-readable medium or memory, to configure the operation of the processor 203. For example, instructions may be stored in a read-only memory (ROM) 207, random access memory (RAM) 205, or other media accessible by the computing device, such as a Universal Serial Bus (USB) drive, compact disk (CD), digital versatile disk (DVD), floppy disk drive, etc. Input/output module 211 may include a microphone, keypad, touch screen, and/or stylus through which a user of computing device 200 may provide input, and may also include one or more of a speaker for providing audio output and a video display device for providing textual, audiovisual and/or graphical output. Software may be stored within memory 213 (e.g., hard drive), RAM 205, and/or ROM 207 to provide instructions to processor 203 for enabling the computing device 200 to perform various functions. For example, memory 213 may store software used by the computing device 200, such as an operating system 215, application programs 217, and an associated database 221. Alternatively, some or all of computing device 200's computer executable instructions may be embodied in hardware or firmware (not shown). Additionally, computing device 200 may operate in a networked environment supporting connections to one or more networked devices. Accordingly, computing device 200 may use network interface 209 to connect to the network. Network interface 209 may manage communications over various networks using various formats, including protocols such as TCP/IP, Ethernet, FTP, HTTP, WiMax, MoCA, Bluetooth® and the like.

One or more aspects of the disclosure may be embodied in computer-useable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Overview

Figure 3:
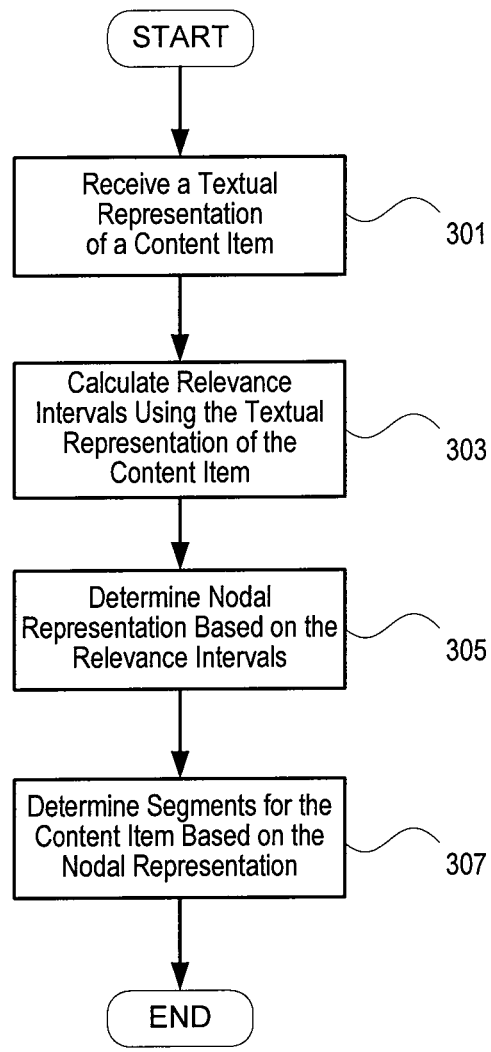
FIG. 3 is a flowchart illustrating an example method for automatically segmenting a content item according to one or more aspects described herein.

One or more aspects of this disclosure relate to providing a method for the automatic segmentation of content items. Such a method may allow for the capture, analysis, indexing, retrieval and/or distribution of information within content items, such as audio or video, with greater functionality, accuracy and speed. For example, the segments may be labeled by topic and then later retrieved, organized by topic, and transmitted to a user as part of a content service, including, for example, video-on-demand, audio service, Internet/web service, etc. FIG. 3 is a flowchart illustrating an example method for automatically segmenting a content item according to one or more aspects described herein.

At step 301 of FIG. 3, text of a content item may be received. The text may be a transcript of spoken words and phrases in the content item, and may include a plurality of terms and/or sentences. In some embodiments, the text may be based on closed captioning or transcript data of the content item. For example, a transcript of a news broadcast may be received in conjunction with a broadcast of the news program.

At step 303, the relevance intervals for the text may be calculated using the text of the content item. The results of this calculation may be stored in a database for later access. A relevance interval may identify one or more sections of a content item (e.g., one or more sentences of the text representation of the content item, time ranges within the program, etc.) that are deemed relevant to a particular set of terms of the text representation. The relevance intervals are calculated using mathematical formulae that, depending upon the type and other characteristics of the content item, may take into account, for example: the clustering of the occurrences of information representations; a set minimum length; the natural breaks in the media, such as paragraphs, changes in slides, verbal pauses, or speaker changes; natural language processing data, such as parts of speech, grammatical structure, multi-word expressions, named entities, and references; semantic information, such as synonyms, classifications, similarities, concepts related by knowledge based connections, and topic similarity; logical structure based upon transition words, prosodic cues, visual layout, surrounding formatting data (e.g., surrounding HTML), topic flow, and statistically measured continuity of topic; and other extracted data. The set minimum length is often needed since a three second video clip, for example, would rarely be of any use within most media files. In one embodiment, a knowledge base (e.g., database) may be created to include statistical measurements of term co-occurrence in corpus data and the relevance intervals may be calculated based on this knowledge base. In one example, a large amount of data may be selected as the corpus, such as a representative sample of newspaper articles. This corpus may then be processed to create the statistical measurements.

One such measurement may be a mutual information score that is calculated between a set pair of terms (e.g., between a first set of terms, A, and a second set of terms, B, of the corpus data, where set A and set B form the set pair of terms). One way to calculate a mutual information score is to, for each set pair of terms, create a table that tabulates the number of times that the set pair occurs in the corpus and the number of times each other set pair occurs within a predetermined distance of the set pair. In other words, this table records the number of times that different pairs co-occur within a window of constant size in the corpus. From this table, the mutual information score can be calculated. One formula for calculating the mutual information score may be:

Let MI(S,P) be the mutual information score between set pair S and set pair P. Let N be the number of words in the corpus. Let #S be the number of occurrences of set pair S in the corpus, let #P be the number of occurrences of set pair P in the corpus, and let #S&P be the number of times set pair S occurs within K terms of set pair P. Then $MI(S,P)=(N/2K)[(\#S\&P)/[\#S][\#P]]$.

The statistical measurements of the knowledge base may be used when identifying one or more sections of a content item that are relevant to a particular set of terms of the text representation. For example, identifying sections that are relevant may include the retrieval of the mutual information scores (e.g., retrieve all set pairs, where one of the sets of terms in the set pair is the particular set of terms and the second set of terms in the set pair is a set of terms in the one or more sections of the content item), and identifying relevant sections based on the mutual information score (e.g., a section is deemed relevant if the mutual information score is above a threshold value).

Figure 4:
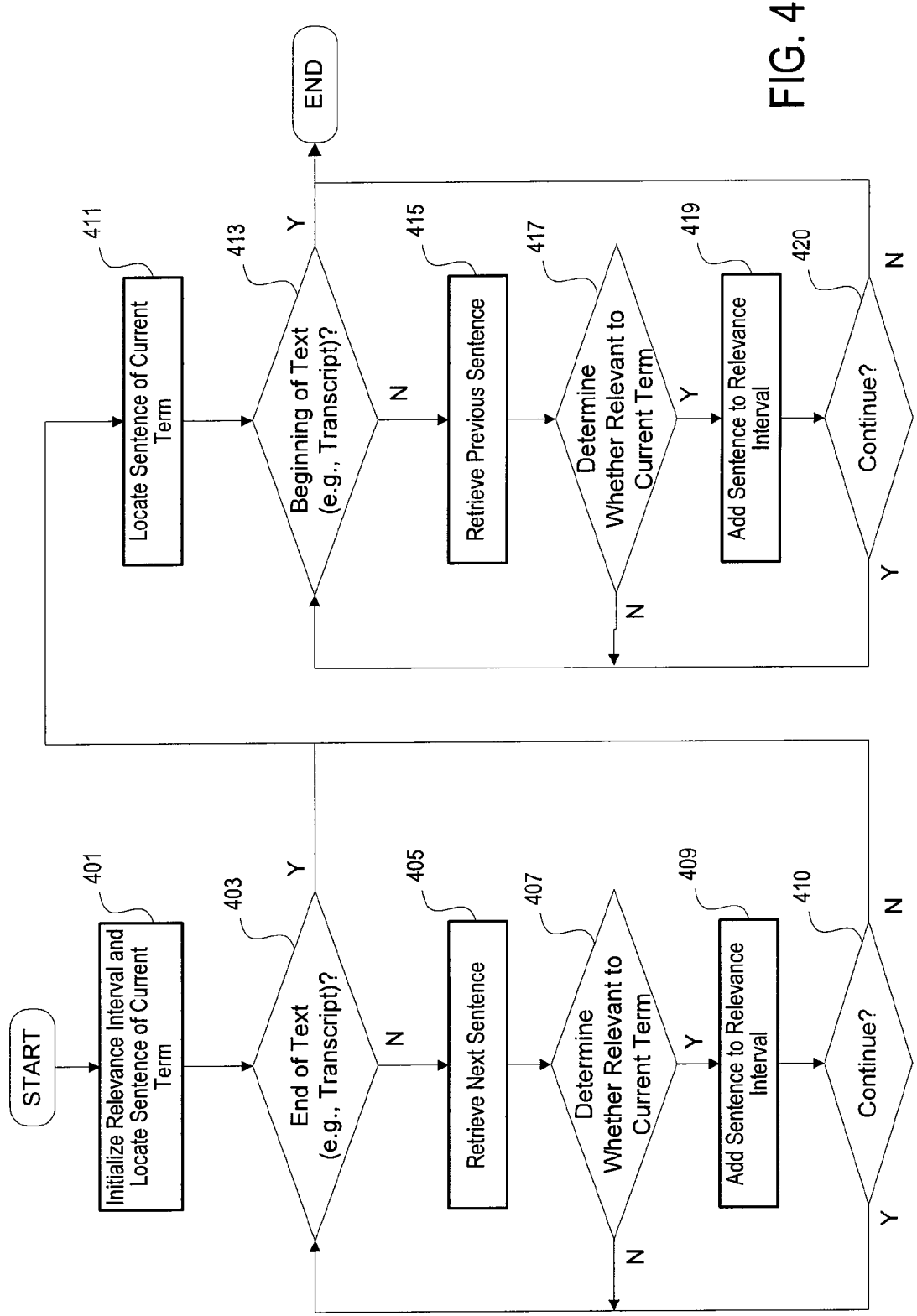
FIG. 4 is a flowchart illustrating an example method for calculating a relevance interval for a term according to one or more aspects described herein.

FIG. 4, discussed in greater detail below, illustrates an example process for calculating a term's relevance interval. Continuing the above example from step 303, a relevance interval may be calculated for each term in the transcript of the news broadcast. A particular relevance interval may identify one or more adjacent sentences of the transcript that are relevant to the relevance interval's associated term (e.g., the term is relevant to the previous two sentences in the transcript and the first sentence following the term). For example, the term "dog" used in a given sentence of a newscast may be determined to be relevant to the next 2 sentences in the transcript of the newscast, based on a comparison of the term "dog" with other terms appearing in those other sentences.

At step 305, a nodal representation of the text and relevance intervals may be generated based on the calculated relevance intervals. This determination may include generating a plurality of nodes, one for each word or phrase in the transcript, and determining connection strengths between the nodes of one sentence and the nodes of neighboring sentences. A connection strength may include a weighted value that represents the connection (e.g., relationship) between two nodes (or words represented by the nodes). The nodal representation may be stored in a database for later access (e.g., printing for viewing by a programmer, etc.).

Continuing the above example from steps 301 and 303, the nodal representation may further include additional nodes based on relevance intervals calculated in step 305, and/or any other representation of the scope (e.g., range) of influence of a term beyond the sentence(s) it occurs in. In one instance, a node for a term in a first sentence is also created for each identified adjacent sentence that is within the term's relevance interval (e.g., if the term is relevant to the previous two sentences and the first sentence following the term, four nodes may be created: one for the term's original sentence, two for the previous two sentences, and one for the first sentence following the term). The nodes created for a particular relevance interval may have a label including the relevance interval's associated term.

At step 307, segments for the content item are determined based on the nodal representation. This may be done, for example, by examining the overall nodal representation of the content's text and relevance intervals, and identifying neighboring sentences in the content text that have a relatively weak contextual links between their respective words/phrases. A topic shift segment boundary can be defined between those sentences, defining different segments on either side of the boundary. Multiple boundaries may be defined, dividing the content into multiple segments, where each segment may include one or more sentences. The words and phrases within each segment can then be examined to identify a topically centralized word or phrase, and that central topic can be used to label the defined segment. Examples and details of this segmentation process appear further below Text of a Content Item As noted above, text of the content item may be processed in order to identify the segments of the content item. The text allows for the analysis of the semantic and discourse cohesion of the content item. Based on the semantic and discourse cohesion of a content item, the content item may be segmented into topical segments (e.g., segmenting where the cohesion is at the weakest). Table 1 illustrates a sample discourse for a content item (e.g., a video or audio) having a person (e.g., "Speaker A") speaking in a conversation that includes a topic shift.

TABLE 1

| |
| --- |
| Speaker A: Yesterday, I took my dog to the park. |
| Speaker A: While there, I took him off the leash to get some exercise. |
| Speaker A: After 2 minutes, Spot began chasing a squirrel. |
| (Topic Shift) |
| Speaker A: I needed to go grocery shopping. |
| Speaker A: So I went later that day to the local store. |
| Speaker A: Unfortunately, they were out of cashews. |

As illustrated in Table 1, a topic shift exists between the third and fourth spoken sentences of the sample discourse. Where this topic shift occurs, the discourse cohesion may be weak (e.g., the topical strength between the terms in the neighboring sentences is relatively weaker than links between other neighboring sentences). Therefore, the content item may be segmented based on where the discourse cohesion is weak (e.g., a first segment including sentences 1-3 and a second segment including sentences 4-6 of the sample discourse). Additionally, based on the terms involved in the segments, each segment may be labeled with a topic determined based on the terms of the respective segment. For example, a segment including sentences 1-3 of the sample discourse may be labeled with the topic of "Dogs" or "Misbehaving Dogs". The segment including sentences 4-6 may be labeled with the topic of "Grocery Shopping" or "Shopping". It is noted that what can be considered the topic of a segment can vary (e.g., the topic of the first segment may be considered as relating to dogs, animals, parks, the Speaker A, exercise, some combination thereof, etc.). Therefore, a wide range of possible topic labels could be determined from the sample discourse. Examples of identifying topic labels for a segment are provided further below, in conjunction with FIGS. 11A & B.

Text of a content item can take various forms. In some arrangements, the text may be extracted from the content item. For example, a speech recognition system may capture the words spoken in a content item, such as an audio or video item. The content item may be processed, using the speech recognition system, to extract the spoken words and record the time at which each word occurs in the content item. The speech recognition system may also determine and record alternatives for extracted words or phrases, and may determine a probability for each determined alternative. The speech recognition system may also capture other aspects of the content item, including pauses and speaker changes. As another example, an optical character recognition (OCR) system may capture words spoken in a content item, such as a video item, when the spoken words are displayed on-screen (e.g., as with subtitles, or closed captioning). An OCR system may record text that is visible during a playback of the content item. The OCR system may extract and record characteristics of the text such as the size, position, style and precise time interval of visibility. As yet another example, a meta-data extraction module may capture embedded data of a content item. A meta-data extraction module may capture information about the content item, including filename and meta-data of the content item, such as tagging information (e.g., MPEG-7 meta-tags, HTML tags, file header information, etc.). The extracted information may be used as an indicator for important terms of the content item. Similarly, summaries of content items (e.g., a capsule description of a television program for display in an electronic program guide) may also provide important terms of the content item. The extracted text representations may optionally be processed by a word-adjustment module to increase the accuracy of the extracted data. Additionally, the text may be a combination of extracted text from different extraction techniques (e.g., a representation based on a two sets of extracted data, the first from a speech recognition system and the second from an OCR system).

In other arrangements, the text of the content item may be supplied with the content and/or received in addition to the content. For example, a transcript, closed captioning data, a written description of the content item's subject matter, or the like may be available that corresponds to a content item. Such sources may be used as the text of the content items. In some embodiments, such text may include the time of occurrence in the content item for a particular term, sentence and/or portion of the text; identifying information of the person speaking; and other information related to the content item, such as pauses, actions, etc. occurring during the content item. Additionally and/or alternatively, such text may be supplied/received as a list of sentences with each sentence labeled with a unique index.

In some embodiments, the text may be further processed. For example, the text may be analyzed term string by term string, term by term, etc. A term string may take various forms including, for example, a sentence. Such a process may include determining grammatical information of the text, such as parts of speech, phrases, verb argument structure, clausal dependencies, and other features. From this information, the sentences may be analyzed according to sentence boundary (e.g., parsed based on punctuation, such as periods; parsed based on capital letters; etc.). Each sentence may be given its own unique index and the time of occurrence of the sentence may be associated with an analyzed (e.g., parsed) sentence.

Table 2 illustrates an example text (e.g., received as input, extracted from the content item, etc.) of the discourse illustrated in Table 1. As seen in Table 2, the discourse is a list of sentences (column 2) having unique labels/indexes (column 1) and associated time codes that represent when the sentence occurs in the content item (column 3).

TABLE 2

| S_1 | Yesterday, I took my dog to the park. | 0:35 |
| S_2 | While there, I took him off the leash to get some exercise. | 0:39 |
| S_3 | After 2 minutes, Spot began chasing a squirrel. | 0:48 |
| S_4 | I needed to go grocery shopping. | 1:01 |
| S_5 | So I went later that day to the local store. | 1:04 |
| S_6 | Unfortunately, they were out of cashews. | 1:11 |

In some arrangements, terms of the text may be processed into a canonical form. For example, the text may be processed to identify occurrences of the same or related words. In one example, the system may identify that the term "mouse" and "mice" are the singular and plural of the same concept, and should be treated as the same word. In a second example, the system may identify that the terms "New" and "York" and "City" are a multi-word expression "New York City" (e.g., when they appear next to each other in the text representation) and should be treated as a single term when processing the text representation. In a third example, for the text representation of Table 2, the terms "dog", "Spot" and "him" may be treated as referring to the same entity (e.g., "dog"), the terms "store" and "they" may be treated as the same term (e.g., "store"), and the terms "grocery" and "shopping" may be treated as a multi-word expression (e.g., "grocery shopping").

In some embodiments, the text may be filtered to remove one or more terms. For example, the text representation may be filtered to leave only those terms that are determined to have semantic meaning. In one example, any occurrences of articles such as "the" and "a" may be filtered out. In a second example, certain nouns, verbs, adjectives, adverbs, punctuation, etc. may be filtered out.

Relevance Interval Calculation

The text, as described above, may be stored in a database for later retrieval (e.g., content server 101 of FIG. 1) and/or may be processed to calculate relevance intervals for the content item. Relevance intervals may be built for one or more terms of the text and, upon calculation, may be stored in a database for future retrieval (e.g., relevance interval database 102 of FIG. 1). In general, a relevance interval may capture (e.g., represent) the scope of a term's influence with respect to one or more sentences of the text (e.g., a relevance interval for a term may span a number of sentences that both precede and are subsequent to the term's sentence). FIG. 4 is a flowchart illustrating an example method for calculating a relevance interval for a term. The depicted method may be repeated for each term in the content's transcript.

At step 401 of FIG. 4, the method of calculating begins with initializing the relevance interval of the current term under consideration (e.g., the first term in the first sentence of a text representation). For example, a term's initial relevance interval may simply be one sentence—the sentence in which the term appears. In some embodiments, initializing the relevance interval may include assigning it information relating to the sentence of the current term (e.g., assigning the current sentence index (e.g., an identifier or handle used to reference the sentence) and/or the time in the content item where the current sentence occurs). A relevance interval listing may include a listing of sentences that are relevant to the current term, and this listing may be initialized to simply list the sentence in which the term appears.

The determination of the relevance interval for the term may be performed by traversing down the transcript (and up) to compare other sentences in the transcript with the current term under consideration, and determining how contextually close those other sentences are to the current term. This can be done, for example, by doing a term-for-term comparison, successively comparing the current term with each term in the neighboring sentence.

At step 403, it is determined whether the end of the text (e.g., transcript of the content item) has been reached (e.g., whether the last sentence of the transcript has been considered). If we are not at the end of the text, then the method proceeds to step 405 and the next sentence is retrieved.

At step 407, upon retrieving the next sentence of the text, it is determined whether the next sentence is relevant to the current term. This determination can be performed in various ways. For example, the relevance may be determined based on a comparison between the current term and each of the terms in the next sentence. Similarity strengths for these term-by-term comparisons can be obtained from a relevance database, and totaled, averaged, or otherwise combined to yield an overall similarity strength between the current term and the next sentence.

In one example, the comparison may take the form of a similarity measurement between the current term whose relevance interval is being measured and the various terms in the next sentence (e.g., pointwise mutual information (PMI), WordNet-based similarity measures, Wikipedia Miner similarity measures, some combination thereof, etc.). In some embodiments, the similarity measurement between two terms may be retrieved from a relevance database. The relevance database may include a large collection of similarity measurements calculated from a large set of data. The similarity database may contain, for example, a large listing of terms, and for each term, the database may list a number of contextually-related terms along with a strength value for the match. So, for example, an entry for the word "dog" may list "park", "bone", "leash" and "owner" (among others), and may include a strength value for the contextual relationship between "dog" and each of the listed words. The strength value can be stronger for words like "leash" and "bone", since those terms quite often relate to dogs, while the strength value for words like "park" and "owner" may be lower, since those terms are often used in other contexts that don't involve dogs. Any desired type of relevance database may be used.

When comparing the relevance of the next sentence to the current term, a strength value may be retrieved from the relevance database by providing a query including the two terms of the desired similarity measurement (the term under consideration, and a term from the next sentence). If the similarity measurement between the current term and one or more of the terms of the next sentence is sufficient, the next sentence may be deemed relevant to the term under consideration and part of the term's relevance interval. For example, a plurality of similarity measurements may be determined between every term in the next sentence and the current term. The next sentence may be relevant if a desired number of similarity measurements are above a threshold (e.g., one measurement is above a threshold value, two or more measurements are "strong," an average strength value exceeds a threshold value, etc.). In other arrangements, the next sentence may be relevant if the cumulative measurement is above a threshold.

As another example, the relevance may be determined based on an analysis of the terms of the sentences. In one example, the relevancy may be based on a pronoun resolution determination (e.g., if the sentences are about the same noun, the sentences may be relevant). In one instance, a first sentence may include the noun "Spot" and the second sentence may include the pronoun "he" which may be resolved to be referring to "Spot." These sentences may be deemed relevant. In another example, the relevancy may be based on the occurrence of a discourse phrase that indicates a continuation or the ending of an interval (e.g., the phrase "In addition" may indicate a continuation, while the phrase "In other news" may indicate the intervals ends).

If the sentence is not relevant to the current term, the method can return to step 403, to determine if this sentence is the end of the text representation, and to continue with checking the next sentence in the transcript. Alternatively, if the next sentence is not deemed relevant, then the system can conclude that the term's relevance in this direction has ended, and the process can cease the downward traversal, and proceed to step 413 for the upward traversal through the script. Additionally and/or alternatively, the process may proceed to step 413 if a threshold number of sentences have been determined to be not relevant (e.g., to allow the interval to reach past a seemingly off-topic remark or joke). In one example, the process may proceed to step 413 if a threshold of consecutive sentences have been determined to be not relevant (e.g., if the previous sentence and the current sentence is not relevant, proceed to step 413). Otherwise, the process may proceed to step 403. In another example, a counter may be incremented for every not relevant sentence and if the counter reaches a threshold (e.g., 4, etc.), then the process proceeds to step 413. Otherwise, the process may proceed to step 403.

On the other hand, if the sentence was determined to be relevant, the method can proceed to step 409, where that sentence is added to the current term's relevance interval. To add the sentence to the relevance interval, the relevance interval is modified with the appropriate information of the next sentence. For example, the relevance interval for the current term may be a list of sentences, sentence labels/indexes, time periods, some combination thereof, etc. associated with that current term. In one example, if the interval for a term is stored as a list having copies of relevant sentences, then the terms of the next sentence may be added to the relevance interval list for the current term. In another example, if the relevance interval for a term is stored according to sentence labels/indexes (e.g., a relevance interval spanning sentence 1, sentence 2 and sentence 3, may be described by a start value of 1 and an end value of 3), the appropriate index value can be updated (e.g., start value may be decremented, end value may be incremented, etc.) to list the relevant sentences according to their indices. In a third example, if the relevance interval is stored as a time value (e.g., time period within a piece of content), then the appropriate start or end value of the relevance interval may be augmented by adding the time values for the next sentence (e.g., making the end time of the next sentence the end time of the interval).

At step 410, a determination is made whether to continue calculating the current relevance interval. In some embodiments, the method may proceed to step 403 if the next sentence was added to the relevance interval in step 409. Otherwise, if the next sentence was not added, the method may proceed to step 411. In other embodiments, the method may always proceed to step 403. In yet other embodiments, the method may proceed to step 411 after two or more consecutive sentences have not been added to the current relevance interval.

If, at step 403, it is determined that the end of the text (e.g., transcript of the content item) has been reached, the method proceeds to step 411, where the sentence of the current term is located (similar to step 401). At step 413, it is then determined whether this location is the beginning of the text (since the upwards traversal would end at the beginning of the script). If this location is the beginning of the text, then the method ends. Otherwise, the method proceeds to step 415, where the previous sentence in the text is retrieved. At step 417, upon retrieving the previous sentence, it is determined whether the previous sentence is relevant to the current term, which may be performed similarly to the determination of step 407. If the previous sentence is relevant, the previous sentence is added to the relevance interval at step 419. Otherwise, the method may proceed directly to step 413 to determine whether this previous sentence is the beginning of the text representation. Alternatively, the process also concludes at the first irrelevant sentence, or may skip one or more sentences, similar to that discussed above in the downward traversal. At step 420, another determination is made whether to continue calculating the current relevance interval. This determination may be similar to the determination made at step 410.

Accordingly, the example process illustrated by FIG. 4 may be repeated until the relevance intervals for the desired terms (e.g., all terms, phrases, or canonical terms or phrases in the text) have been calculated.

Additionally, in some arrangements, the relevance intervals may be subject to post-processing. In some embodiments utilizing post-processing, the relevance intervals may be indexed for easier retrieval. For example, words may appear multiple times in a document and, thus, may also have multiple relevance intervals. To facilitate quicker retrieval of the relevance intervals, the relevance intervals for a text representation may be indexed by the term for which the relevance intervals were calculated. The relevance intervals may be searched by term to retrieve any and/or all of the relevance intervals associated with that term. In other embodiments utilizing post-processing, the relevance intervals may be merged. For example, if two relevance intervals for a term are sufficiently close (e.g., the end of the first relevance interval lies within a predetermined number of sentences from the start of the second relevance interval), the two relevance intervals may be merged.

Table 3 illustrates three example relevance intervals that may be calculated from the text representation illustrated in Table 2. As shown in Table 3, each relevance interval is given a label according to the term for which it was calculated, the sentence in which the term occurred, the start and end sentence for the interval (e.g., sentence boundary), and the start and end time of the content item for the interval (e.g., the start and end time-codes of the sentence in the content item).

TABLE 3

| Term | Term Sentence | Sentence Begin | Sentence End | Time Begin | Time End |
|---|---|---|---|---|---|
| Dog | S_1 | S_1 | S_3 | 0:35 | 1:01 |
| Leash | S_2 | S_1 | S_3 | 0:35 | 1:01 |
| Exercise | S_2 | S_2 | S_2 | 0:39 | 0:48 |

Figure 5:
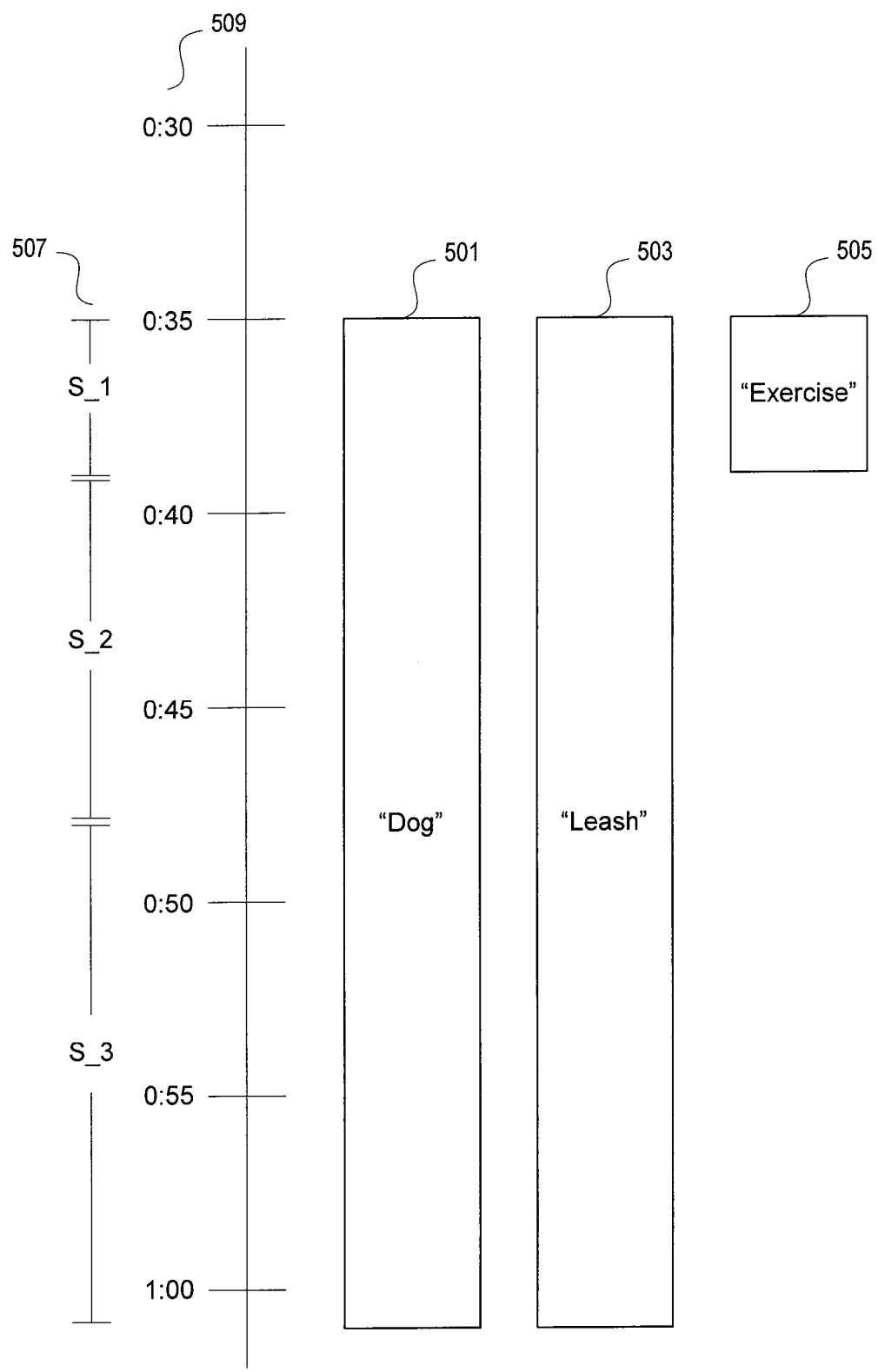
FIG. 5 is a graphical illustration of relevance intervals, according to one or more aspects described herein.

FIG. 5 is a graphical illustration of relevance intervals. Specifically, FIG. 5 is a graphical illustration of the relevance intervals included in Table 3. As seen in FIG. 5, the relevance interval for "Dog" is interval 501, which spans three sentences (S_1, S_2 and S_3) and 25 seconds of the program (from the 35 second mark to the one minute mark); the relevance interval for "Leash" is interval 503; and the relevance interval for "Exercise" is interval 505. Each illustrated relevance interval spans a particular time of the content item and/or sentences of the text representation. The illustration of FIG. 5 provides indications of the sentences of the text representation 507 and the time-codes of the content item 509.

Nodal Representation Determination

Figures 6A, 6B:
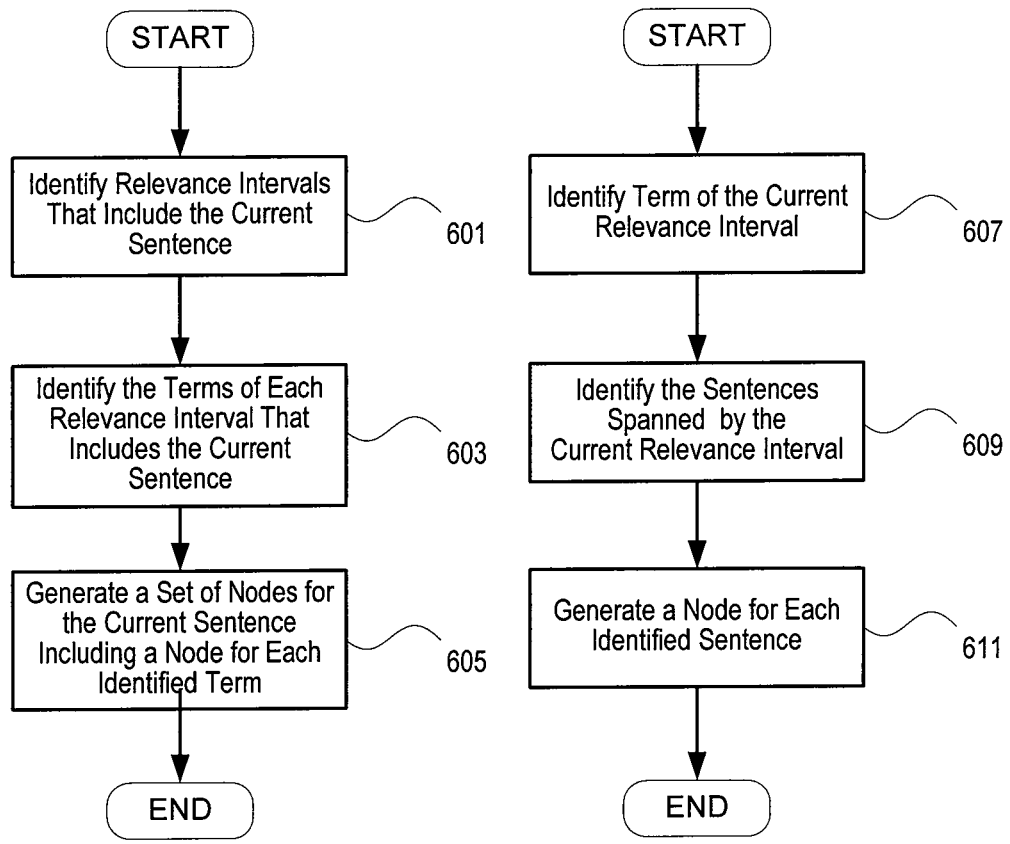
FIGS. 6A and 6B are flowcharts illustrating example methods for determining the nodes of a nodal representation, according to one or more aspects described herein.

A nodal representation (e.g., graph representation having nodes) can be created from the text and the relevance intervals. The nodal representation can include successive rows of nodes, each row corresponding to a sentence in the content text, and each row containing rows for 1) the terms in the sentence represented by the row; and 2) the terms in neighboring sentences whose relevance intervals were determined to extend to include the current sentence. The nodal representation may include a plurality of connection strengths between nodes in neighboring rows. FIGS. 6A and 6B are flowcharts illustrating an example method for determining a set of nodes of the text. In some embodiments, these methods may be repeated as desired. For example, FIG. 6A may be repeated until a set of nodes has been determined for each sentence of the text. FIG. 6B may be repeated until a set of nodes has been determined for each relevance interval.

FIG. 6A is a flowchart illustrating an example method of determining a set of nodes in a sentence-centric manner (e.g., the steps 601-605 can be repeated for each sentence in a show's script). At step 601 of FIG. 6A, the relevance intervals that include the current sentence are identified. These relevance intervals can include intervals for the terms in the current sentence, as well as intervals from terms in neighboring sentences. In other arrangements the identified relevance intervals are those that include the current sentence in their list of sentences. For example, if the current sentence is S_1 of Table 2 and the relevance intervals that will be searched are those illustrated in Table 3, then the identified relevance intervals may be the relevance interval for "Dog" and the relevance interval for "Leash" but not the relevance interval for "Exercise" because the "Exercise" relevance interval does not span S_1 of Table 2 (e.g., S_1 is outside the sentence boundary of the "Exercise" relevance interval, etc.).

At step 603, the terms for each relevance interval that include the current sentence are identified. Generally, the identified term is the term for which the relevance interval was calculated. For example, with respect to the above example where the identified relevance intervals for S_1 are the relevance interval for "Dog" and the relevance interval for "Leash", the identified terms would be "Dog" and "Leash".

At step 605, a set of nodes for the current sentence is generated. In some arrangements, the set of nodes may be generated to include a node for each term identified in step 603. In some embodiments the nodes may be given a label. For example, the label may indicate various types of information including information based on the relevance interval (e.g., term, term sentence, time-code, interval boundary, etc.) and/or the text representation (e.g., sentence number). In another example, the label may indicate the term, the sentence number where the term occurred in the text representation, and/or other information about the term (e.g., whether it is a multiple word term, etc.).

Alternatively, the nodal representation may be generated by iterating through the relevance intervals. FIG. 6B is a flowchart illustrating an example method of determining a set of nodes in a relevance interval-centric manner. At step 607 of FIG. 5, the term of a current relevance interval is identified (e.g., "Dog", "Leash", etc.).

At step 609, the sentences spanned by the current relevance interval are identified. For example, if the current relevance interval is the interval associated with the term "Dog" of Table 2, then the identified sentences may be sentences S_1, S_2 and S_3.

At step 611, a node for the term (e.g., "Dog") is generated for each identified sentence. Each node may be added to a set of existing nodes for the terms that already appear in the particular sentence (e.g., a node for "Dog" may be added to the respective set of nodes for sentences S_1, S_2, and S_3, even though the term "Dog" only literally appears in sentence S_1). Each node may be given a label.

Figure 7A:
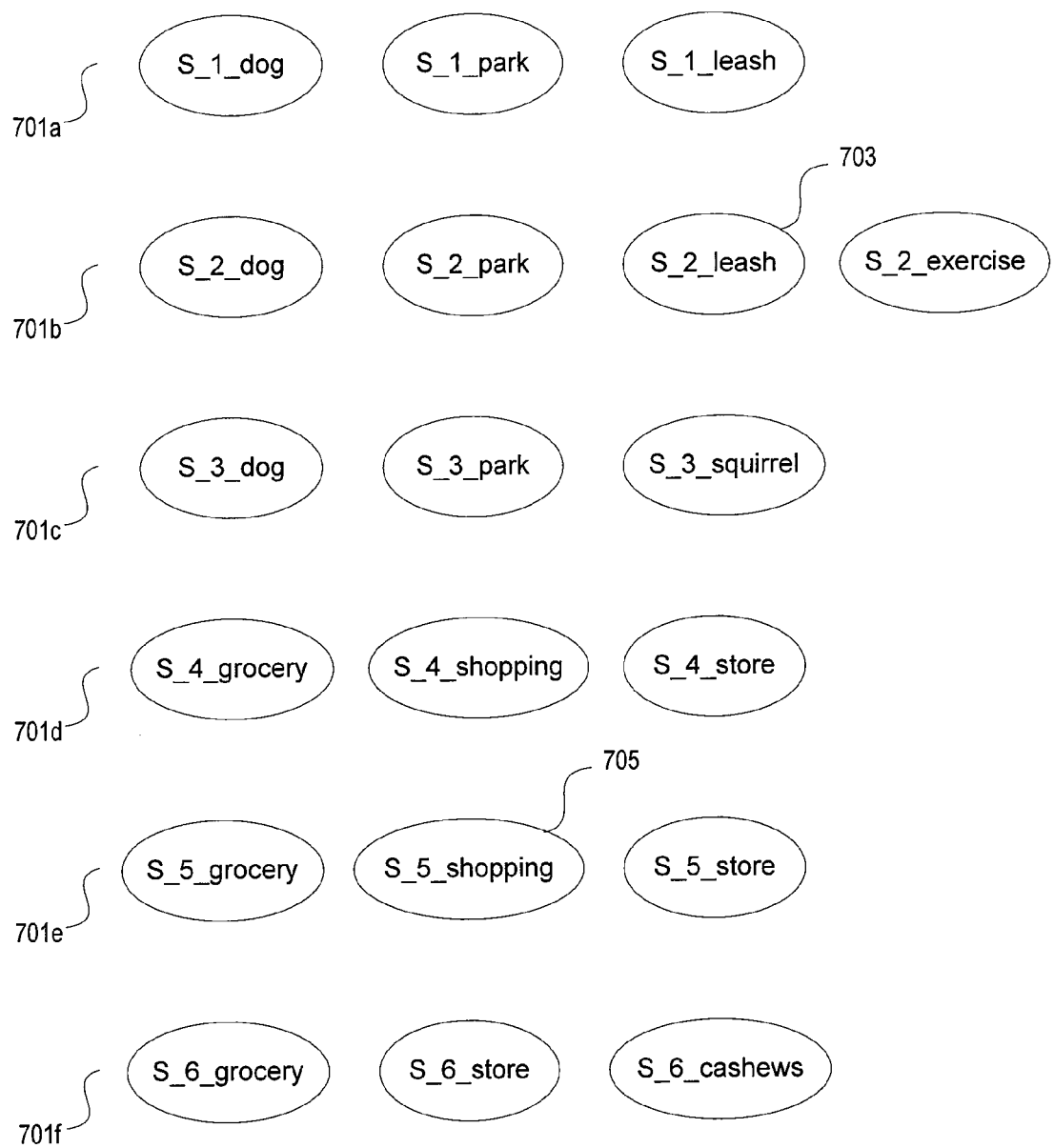
FIGS. 7A and 7B are graphical illustrations showing example nodal representations having generated sets of nodes according to one or more aspects described herein.
Figure 7B:
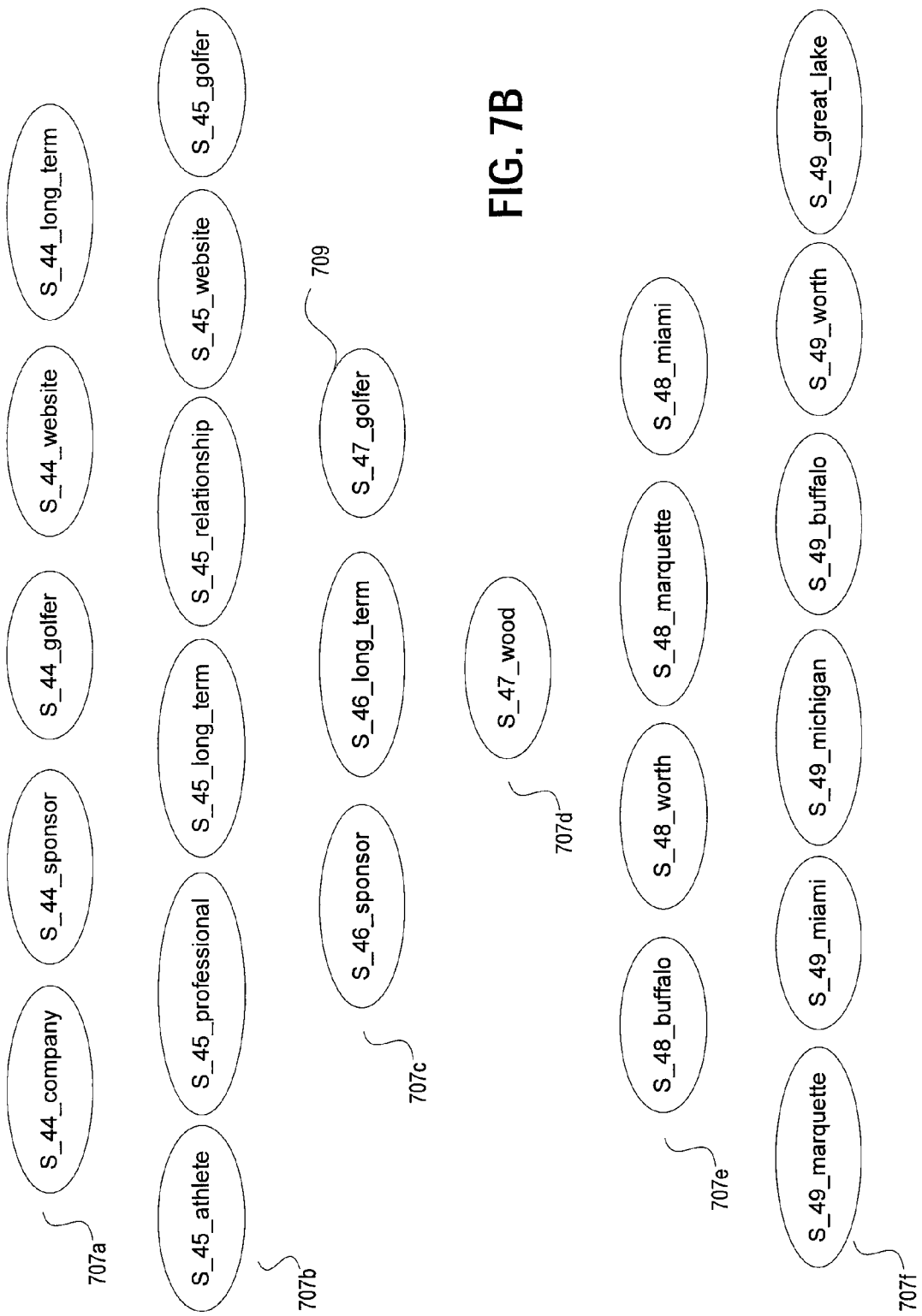

As discussed above, the method illustrated by FIGS. 6A and 6B may be repeated as desired. Additionally, the nodal representation may be organized according to the sentences of the text. Accordingly, in some arrangements, a set of nodes may be generated for each sentence in a content's text. FIGS. 7A and 7B are graphical illustrations showing example nodal representations having generated sets of nodes. The nodes of FIG. 7A illustrate one such arrangement where a set of nodes has been generated for each sentence in a text representation. In the example illustrated in FIG. 7A, a set of nodes 701a-701f has been generated for each sentence of the text (e.g., S_1 to S_6 of Table 2). Each set of nodes from 701a-701f was generated based on the relevance intervals of the content item (e.g., the set of nodes 701a represents the relevance intervals that included S_1 of Table 2). For example, node 703 was generated because a relevance interval for "leash" included the second sentence of the text (e.g., S_2 of Table 2). As another example, node 705 was generated because a relevance interval for "shopping" included the fifth sentence of the text representation (e.g., S_5 of Table 2).

As also illustrated in FIG. 7A, each node of the sets of nodes 701a-701f has been given a label. The label includes the term and the sentence number of the text representation for the set of nodes. For example, the label for node 703 is "S_2_leash". Therefore, the term for node 703 is "leash" and the sentence number for node 703 (and the other nodes in set of nodes 701b) is sentence "S_2" (e.g., the second sentence of the text representation). FIG. 7B illustrates a second example nodal representation having sets of nodes 707a-707f. The nodal representation of FIG. 7B is a portion of a larger nodal representation that was generated from a content's text that is different than the text used in the illustration of FIG. 7A. Accordingly, the labels of the nodes of FIG. 7B reflect the position of the illustrated portion with respect to the text representation. For example, as seen by node 709, it belongs to a set of nodes that was generated for the forty-seventh sentence of the text representation (e.g., S_47 of the text representation).

A nodal representation may include a plurality of connections between the nodes. Each connection in the plurality of connections may be associated with a connection strength. A connection strength represents the contextual connection between at least two items (words, phrases, etc.) represented by the nodes. If the contextual strength is strong, the connection strength may be a higher value. Similarly, when the contextual connection is weak, the connection strength may be a lesser value. In some arrangements, a connection strength may represent the contextual connection between two nodes of the nodal representation. For example, a connection strength may be calculated between nodes in a first set of nodes and a second set of nodes. In one example, the first set of nodes and the second set of nodes are adjacent sets of nodes in the nodal representation (e.g., the set of nodes for sentence N and the set of nodes for sentence N+1).

Figure 8:
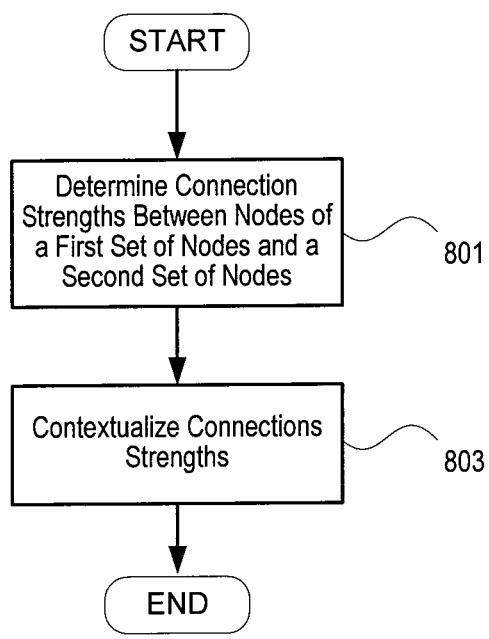
FIG. 8 is a flowchart illustrating an example method for determining the connection strengths between a first set of nodes and a second set of nodes, according to one or more aspects described herein.

FIG. 8 is a flowchart illustrating an example method for determining the connection strengths between nodes of a first set of nodes and a second set of nodes. At step 801, the connection strengths between nodes of the first and second sets of nodes are determined. In some arrangements, this may include determining, for each node in the first set of nodes, the current node's connection strength with each node in the second set of nodes (e.g., computing the connection strengths between the current node and all nodes in the second set of nodes, computing the connection strengths between the first node and all nodes of the second set of nodes, except those nodes having the current node's term, etc.). In one instance, if the second set of nodes has N nodes, each node in the first set of nodes may have N individual connection strengths (e.g., individually calculating the connection strength between a node of the first set of nodes and the nodes of the second set of nodes).

In some embodiments, each connection strength may include a weighted value that represents the connection (e.g., relationship) between two nodes. The connection strength between two nodes may be calculated using various measures. For example, the connection strength between two nodes may be computed based on the terms of the two nodes. In one example, the calculation for a connection strength between two nodes may include calculating a similarity measurement (e.g., PMI, WordNet-based similarity measures, Wikipedia Miner similarity measures, some combination thereof, etc.) that measures how inter-related the terms of the nodes are to each other. Additionally or alternatively, the computed connection strength may be normalized (e.g, normalized to be within a range from zero to one), and/or bounded (e.g., set to zero if negative, set to one if greater than one, etc.). In another example, these connection strengths may be obtained from a general relevance database, discussed above, which may include a dictionary-like list of words and phrases, where each term is listed with a selection of other terms that are often contextually related.

The discussion above addresses connection strengths between nodes in different sentences. These connection strengths may also take into account strengths between a term's node and other nodes within the same sentence, to contextualize the connection strength. At step 803, the connection strengths may be contextualized. Contextualizing the connection strengths may increase the accuracy of the connection with respect to the actual content of the content item. Terms in a sentence are often closely related, and, similarly, if the terms representing the nodes are related, the connection strengths of two nodes may also be closely related. For example, if node N1 and node N2 are both in the first set of nodes and have terms that are closely related, the connection strengths of N1 and the connections strengths of N2 may be strong at the same nodes in the second set of nodes, and/or weak at the same nodes in the second set of nodes. Therefore, because of this relationship, the connection strengths of N2 may be used to reinforce the connection strengths of N1.

In some embodiments, contextualizing the connection strengths includes modifying the connections strengths so that each connection strength is based on other connections of the sets of nodes. For example, a connection strength between Node A of the first set of nodes and Node B of the second set of nodes may be contextualized based on one or more of the following connection strengths: connections between Node A and one or more other nodes of the second set of nodes; connections between Node B and one or more other nodes of the first set of nodes; connections between Node A and one or more other nodes of the first set of nodes; and connections between Node B and one or more other nodes of the second set of nodes. In one example, referring to the nodes and connection strengths of FIG. 9A, the connection strength of connection 909 may be contextualized in the following manner. Connection 909 is the link between the terms "shopping" and "grocery" and the associated connection strength may initially have the value of 0.6 (strengths may use any scale, such as a normalized scale in which 1.0 is an extremely strong connection and 0.0 is no connection at all).

Figure 9A:
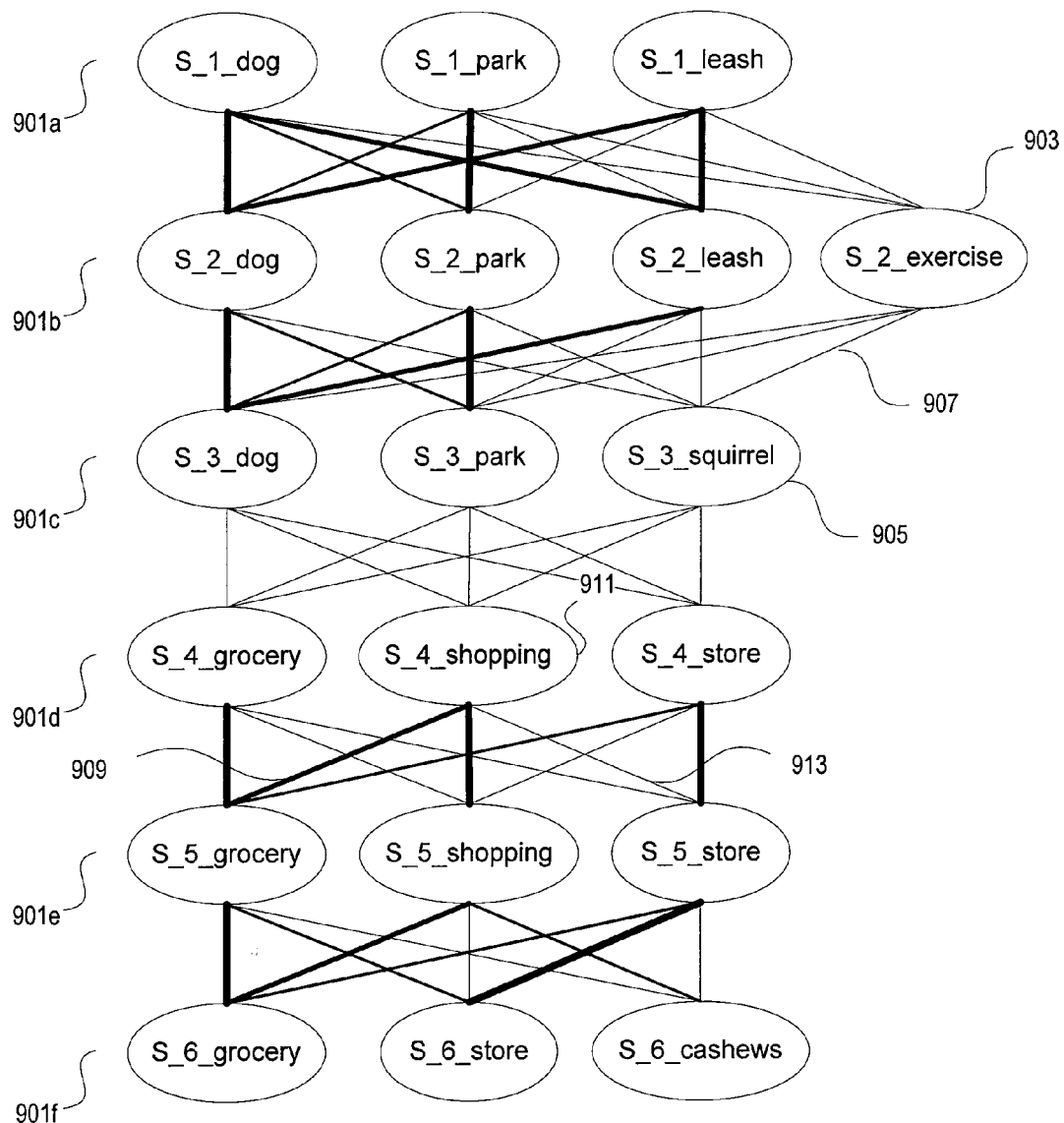
FIGS. 9A and 9B are graphical illustrations showing example nodal representations having generated sets of nodes and connections according to one or more aspects described herein.

This initial value may be modified according to the other connection strengths between set of nodes 901d and set of nodes 901e. In one instance, the value of the connection strength of connection 909 may be increased for every additional connection strength that has a relationship with "shopping" (e.g., the connection strengths of connections between set 901d and set 901e beginning at node 911) that is greater than a threshold value (e.g., 0.5). As illustrated in FIG. 9A, there are two additional connections beginning at node 911. Thus, the connection strength of connection 909 may be increased if these two additional connections have an associated connection strength that is greater than the threshold value (e.g., connection strength of connection 911 may be increased to 0.7 if connection strength of connection 913 is greater than 0.5). In another example, the contextualized connection strength determination can be summarized as follows:

Let $S(x,y)$=(the connection strength between node x and node y). Let a=(a node in the first set of nodes, W). Let b=(a node in the second set of nodes, Z). Let c=(a current node in the first set of nodes). Let d=(a current node in the second set of nodes). Then $S(a,b)=[\Sigma_{c \in W}(S(c,a)*S(c,b))]+[\Sigma_{d \in Z}(S(d,a)*S(d,b))]$.

As illustrated in the above example, the similarity between a or b and another term in W or Z may add to the connection strength between a and b, weighted by the similarity of that term to a or b, respectively. If two terms in the first sentence are strongly related (e.g., "dog" may be strongly related to "leash"), then any relationship the terms have with other terms may be made contextually stronger (e.g., the relationship between "park" and "leash" may be made stronger). Similarly, if two terms in the first sentence are weakly related (e.g., "dog" may be weakly related to "exercise"), then any relationship the terms have with other terms may be made contextually weaker (e.g., the relationship between "leash" and "exercise" may be made weaker). In other arrangements, the contextualized connection strength may be normalized (e.g., normalized to be within a range from zero to one, normalized by the total number of connection strengths used when contextualizing, etc.), and/or bounded (e.g., set to zero if negative, set to one if greater than one, etc.).

Figure 9B:
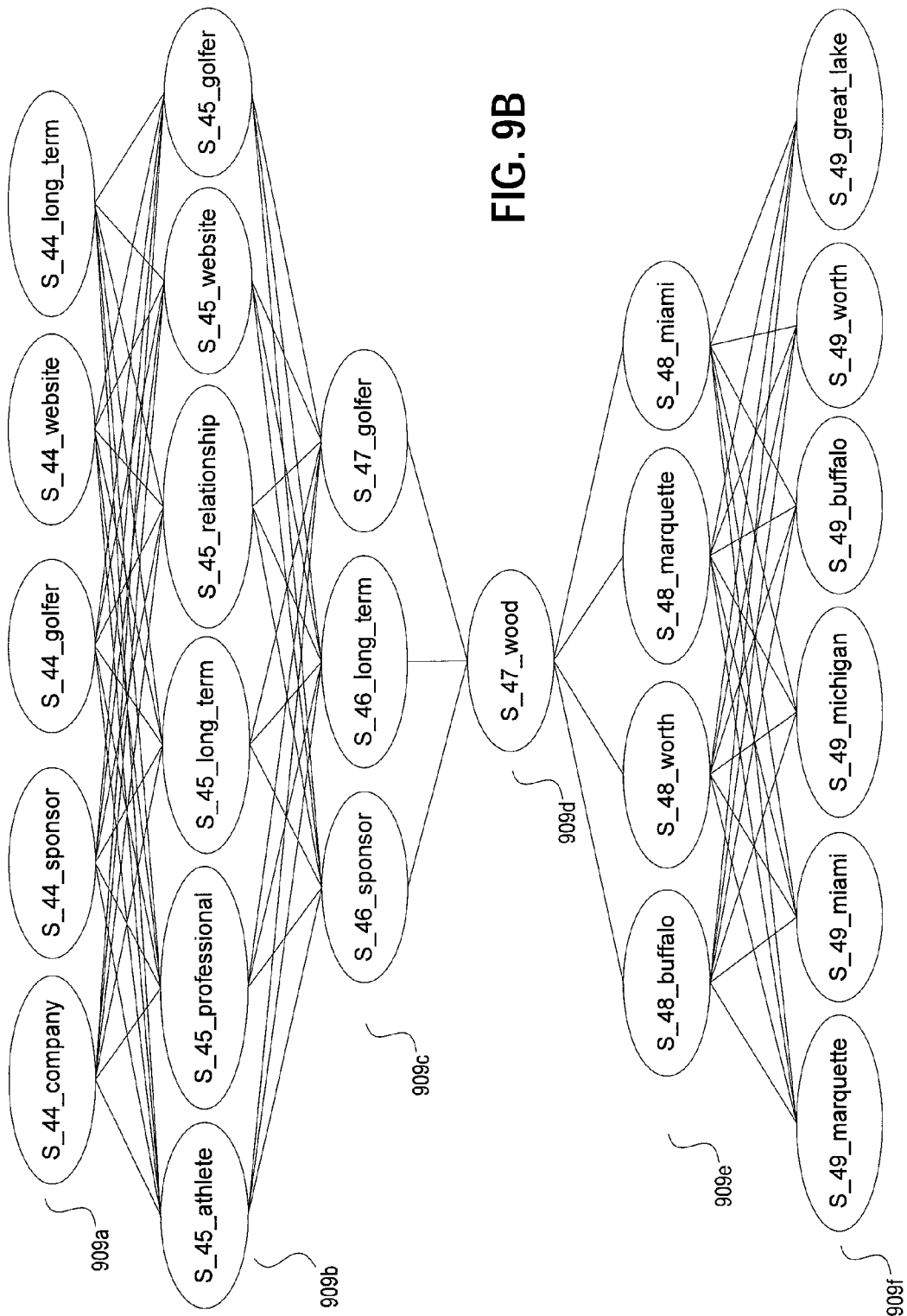

FIGS. 9A and 9B are graphical illustrations showing example nodal representations having generated sets of nodes and connections between adjacent sets of nodes. In FIGS. 9A and 9B, each connection is illustrated as a line that extends between the nodes whose relationship it represents. In the illustrated example, a stronger connection strength is illustrated by a connection with a thicker line. Each connection strength calculation may include contextualizing the connection strength, as described above. As seen in FIG. 9A, set of nodes 901a-901f have connections between adjacent sets of nodes. For example, node 903 and node 905 have connection 907. FIG. 9B illustrates connections for a nodal representation (e.g., set of nodes 909a-909f) that is different than that illustrated in FIG. 9A, and is similar to the connections that may be generated according to the nodal representation of FIG. 7B (e.g., the connections for the nodal representation of FIG. 7B would additionally include connections from a set of nodes previous to set of nodes 707a and connections to a set of nodes coming after set of nodes 7070.

Segment Determination

Figure 10:
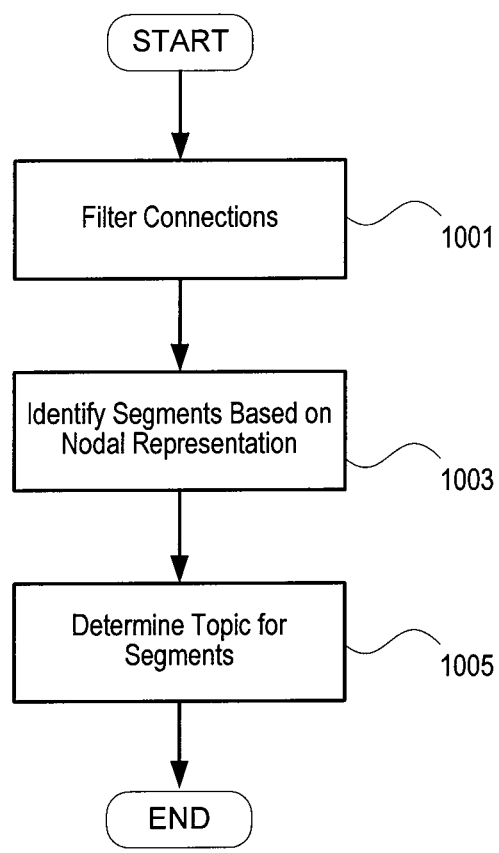
FIG. 10 is a flowchart illustrating an example method for determining the segments of a content item based on a nodal representation, according to one or more aspects described herein.

According to one or more aspects of the disclosure, the segments of the content item may be determined based on the nodal representation. FIG. 10 is a flowchart illustrating an example method for determining the segments of a content item based on a nodal representation. At step 1001, the connections of the nodal representation may be filtered. As discussed above, the connections may be associated with connection strengths that include values representing both strong and weak contextual connections. Therefore, these values may be leveraged to assist in determining the boundaries of segments in the content item. For example, strong contextual connections between two sets of nodes may indicate that the sentences corresponding to the sets of nodes should belong to the same segment. Weak connections, on the other hand, may indicate that the sentences corresponding to the sets of nodes should belong to different segments and/or that a segment boundary exists between the sets of nodes.

In some arrangements, weak connections (e.g., edges, links, etc.) may be filtered out from the nodal representation (e.g., by removing edges, links, and/or connection from the nodal representation). There are various options for filtering weak connections. For example, connections between nodes having a connection strength below a threshold may be removed. In another example, connection may be removed until a maximum number of connections remain (e.g., removing connections from weakest to strongest connection strength until N connections remain between the two sets of nodes). In yet another example, the connections may be filtered based on the cumulative connection strength of adjacent sets of nodes. In one such example, the connections between two neighboring sets of nodes may be removed if the cumulative value of the connection strengths between the sets of nodes is not greater than a threshold cumulative value. In another example, the connections may be filtered based on the terms of the nodes (e.g., remove connections between nodes having the same or substantially similar terms, etc.). In yet another example, the connections may be filtered based on their measured centrality (e.g., remove connection strengths that have high measured centrality). In one such instance, an edge betweenness algorithm may be used to calculate a connection strength's centrality. For example, an edge betweenness algorithm may determine how many of the paths (e.g., shortest paths) between nodes of the nodal representation pass through the current edge (e.g., connection). A connection's centrality is based on the number of paths that pass through the connection (e.g., a connection has greater centrality the greater the number of paths passing through the connection). Connections that have high centrality may be an indicator of a segment boundary because there are likely to be relatively few connections between nodes at those points. Therefore, in one embodiment, connections having a centrality measurement greater than a threshold may be removed from the nodal representation.

Figure 11A:
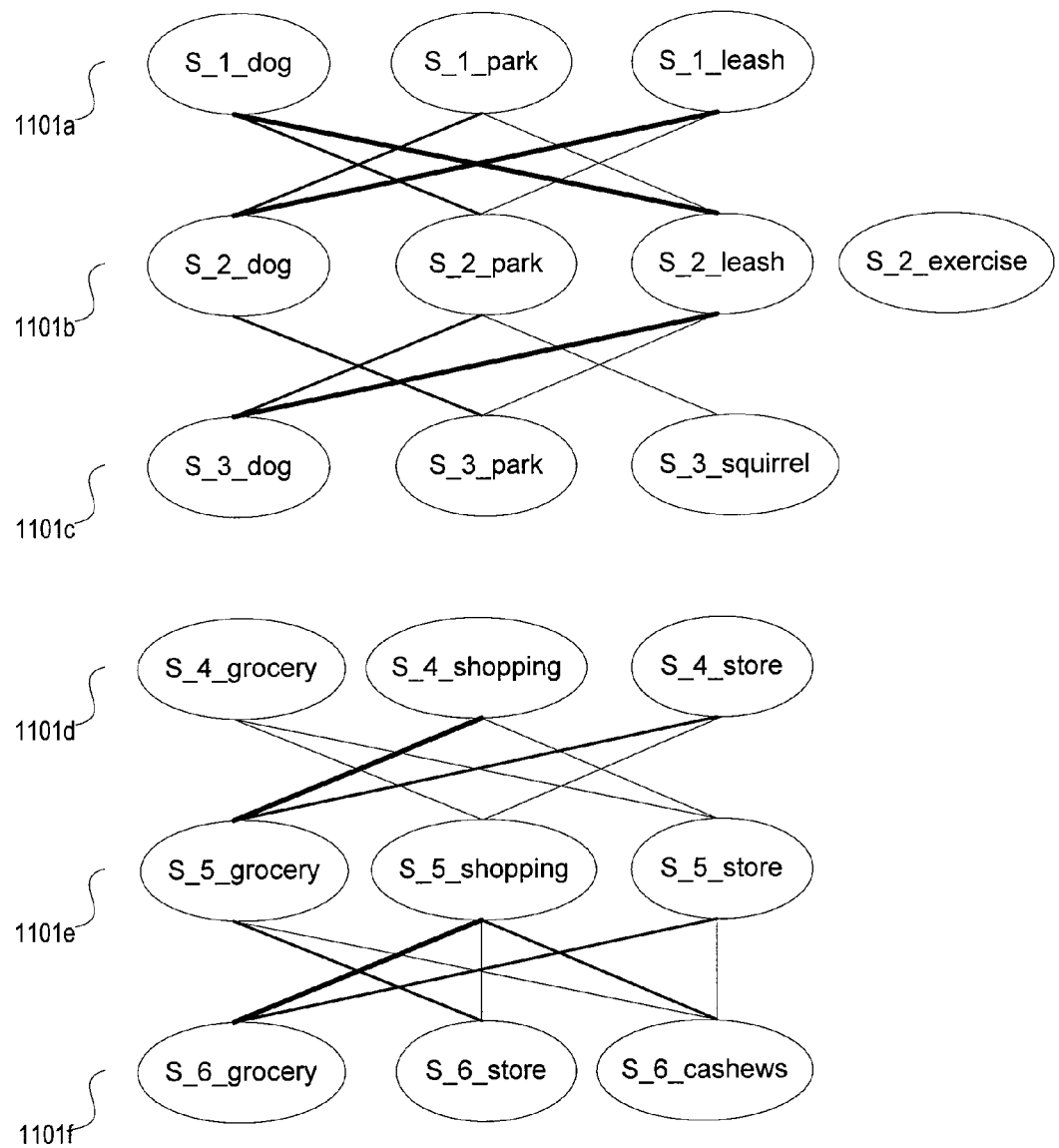
FIGS. 11A and 11B are graphical illustrations showing example nodal representations according to one or more aspects described herein.
Figure 11B:
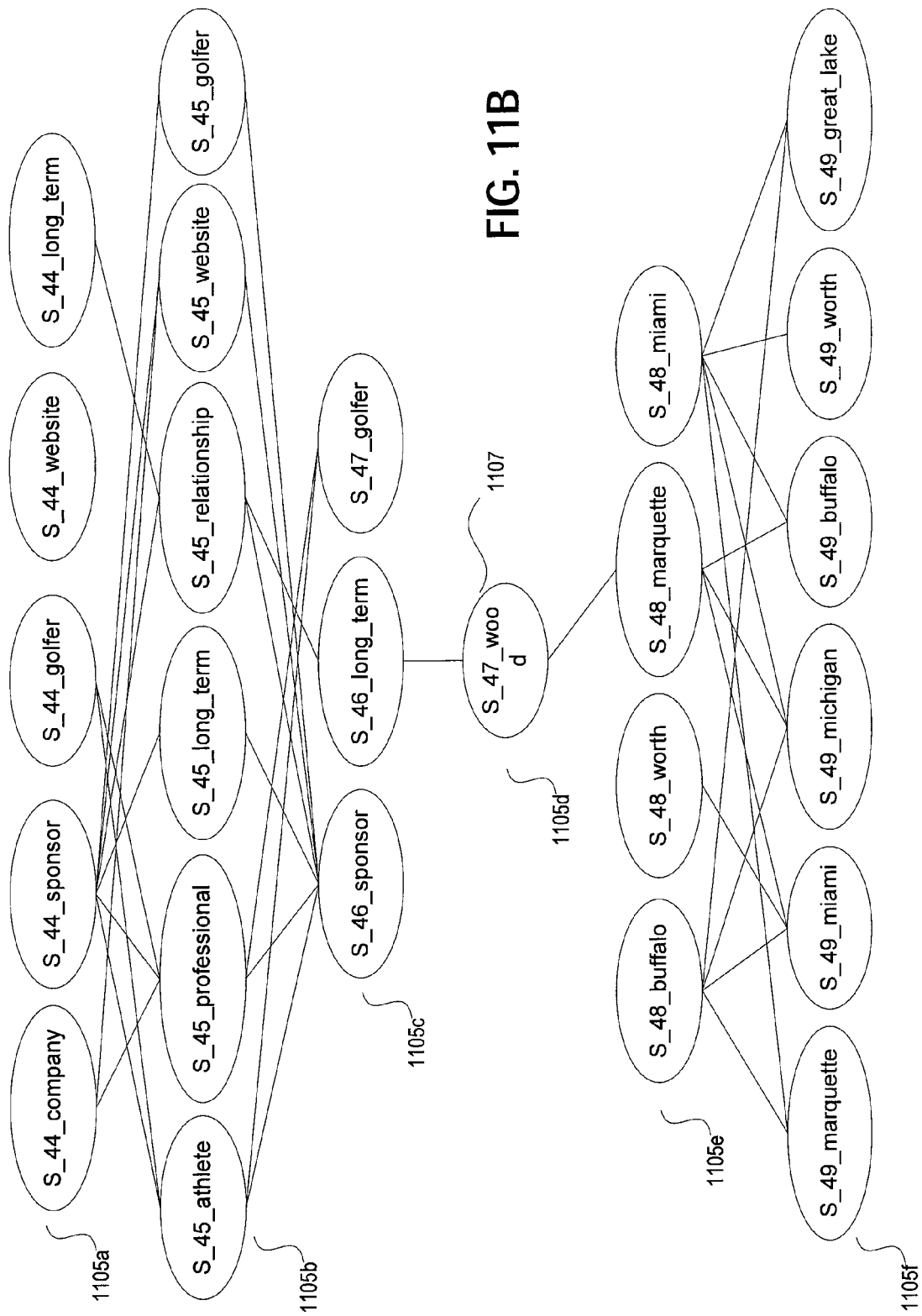

FIGS. 11A and 11B are graphical illustrations showing example nodal representations having sets of nodes and filtered connections. FIG. 11A illustrates a filtered nodal representation after filtering the nodal representation of FIG. 9A using one or more techniques described above. By comparing the connections between FIG. 9A and FIG. 11A (e.g., set of nodes 1101a-1101f of FIG. 11A and set of nodes 901a-901f of FIG. 9A), it can be seen that some connections between the sets of nodes have been removed. FIG. 11B illustrates a filtered nodal representation resulting from filtering the nodal representation of FIG. 9B using one or more techniques described above. By comparing the connections between FIG. 9B and FIG. 11B (e.g., set of nodes 1105a-1105f of FIG. 11B and set of nodes 909a-909f of FIG. 9B), it can be seen that some connections between the sets of nodes have been removed.

Referring again to FIG. 10, at step 1003, the segments for the content item may be identified based on the nodal representation. In one embodiment, the nodal representation may be analyzed to determine where the connections indicate a possible segment boundary. In one instance, a segment boundary may be indicated based on the number of connections between sets of nodes (e.g., a boundary exists if the number of connections is below a threshold). In another instance, a segment boundary may be indicated based on the magnitude of the connection strengths between sets of nodes (e.g., a boundary exists if the cumulative value of the connection strengths is less than a threshold). A segment boundary may be identified based on other techniques, such as based on an average of the connection strengths (e.g., a boundary is indicated if the average is below a threshold value), a median connection strength (e.g., a boundary is indicated if the median is below a threshold value), etc. In yet another, a segment boundary may be indicated based on a hybrid strategy that determines a boundary based on both the magnitude and the number of the connection strengths between sets of nodes. Additionally or alternatively, a segment boundary may be determined based on a set of nodes being the first or last set of nodes in the nodal representation.

Referring to the filtered nodal representation of FIG. 11A, one possible segment boundary is between set of nodes 1101c and 1101d, because there are no connections between those sets of nodes. Referring to the filtered nodal representation of FIG. 11B, two possible segment boundaries are the possible boundaries between set of nodes 1105c and 1105d, and set of nodes 1105d and 1105e (e.g., there are few and/or weak connections between those sets of nodes). Additionally or alternatively, in situations where two possible segment boundaries are determined adjacent to each other (e.g., the two possible boundaries at set of nodes 1105c-1105e of FIG. 11B), a single boundary may be selected from the adjacent boundaries. Thus, in one example, with respect to the nodal representation of FIG. 11B having adjacent boundaries between set of nodes 1105c-1105e, the segment boundary between set of nodes 1105c and 1105d may be selected as the boundary. Alternatively, the segment boundary between set of nodes 1105d may be selected as the boundary.

Referring again to step 1003 of FIG. 10, once the segment boundaries have been determined, the sentences corresponding to the set of nodes that are within two segment boundaries may determine the segments for the content item. For example, each set of nodes may correspond to a sentence in the text representation (e.g., set of nodes 1101a of FIG. 11A may correspond to the first sentence of the text representation of Table 2) and each sentence may have a time of occurrence in the content file. Therefore, in one example, a segment of the content item may include the portion of the content item that includes the sentences corresponding to the sets of nodes that are within the two segment boundaries. Similar segments may be determined for every pair of segment boundaries. Additionally, information about these segments may be stored for future access (e.g., in segment database 103 of FIG. 1). For example, the sentence numbers and/or the time of occurrences for a segment may be saved as an index that allows for searching of the content by segment.

Referring to the filtered nodal representation of FIG. 11A, assuming a segment boundary is determined immediately before set of nodes 1101a, between set of nodes 1101c and set of nodes 1101d, and immediately after set of nodes 1101f, two segments for the content item may be determined based on this nodal representation. The first segment corresponds to the sentences of the sets of nodes 1101a-1101c (e.g., sentences S_1 through S_3 of Table 2). Thus, the first segment of the content item includes the portion that corresponds to these sentences of the text representation (e.g., with respect to the text representation of Table 2, 0:35 through 0:48, and optionally up to 1:01 of the content file). The second segment corresponds to the sentences of the sets of nodes 1101d-1101f (e.g., sentences S_4 through S_6 of Table 2). Thus, the second segment of the content item includes the portion of the content file that corresponds to these sentences of the text representation (e.g., with respect to the text representation of Table 2, at least 1:01 through 1:11 of the content item).

Segment Topics

Referring again to FIG. 10, at step 1005, the topic for the determined segments may be identified. Upon identification, the topic may be assigned to the segment and/or stored in a database for future access (e.g., in segment database 103 of FIG. 1). The topic may be determined in various manners, including based on the sets of nodes, the connections between the nodes, and/or the text representation. In some arrangements, the topic may be determined based on a term's frequency of appearance in the sets of nodes. For example, the topic may be determined based on one or more terms that frequently appear in the sets of nodes. In one example, the most frequently appearing term may be the determined topic (e.g., for the first segment of the nodal representation illustrated in FIG. 11A, "dog" and "park" are the most frequently appearing terms; therefore, the topic for the segment may be "dog" or "park" or some other topic label based off dog and/or park). In another example, the top N most frequently appearing nodes may be the determined topic (e.g., for the first segment of the nodal representation illustrated in FIG. 11A with an N of 3, "dog", "park" and "leash" are the 3 most frequently appearing terms, thus the topic may be based off these terms). In other arrangements, the topic may be determined based on the connection strengths within a segment. For example, the topic may be determined based on the number of connection strengths (e.g., the term for the node having the highest number of strengths may be the topic). In another example, the topic may be determined based on the magnitude of the connection strengths (e.g., the term for the node having the highest magnitude of a connection strength, or the highest cumulative total connection strength, may be the topic). In yet other arrangements, the topic may be determined based on a node's centrality measurement. In one example, using the centrality measurement, the topic may be determined as the most "central" node and/or term, or the least central node and/or term. Centrality may involve identifying a center of mass for the node segment, such as by examining the nodes to find one that has the most upwards and downwards connections. In another example, the topic may be determined as the N most central nodes/terms, or the N least central nodes/terms, etc.

A centrality measurement of a node or term may measure quantitatively how central the node/term is to the surrounding nodes/terms. For example, a term's centrality may be measured based on the grammatical structure of the term's sentence. In one method of calculating a term's centrality, the phrases, such as the nouns, verbs and prepositional phrases of the term's sentence are identified. Based on this identified information, lexical information concerning the identified verbs as well as the structure and order of the identified phrases may be analyzed. Based on the analysis, a centrality weight is assigned to each term based on its part of speech, role within a phrase, and the role of the phrase within the sentence. In some arrangements, the higher the assigned weight, the more central the term is to the sentence. A node's centrality may be similarly measured based on the structure of the node's set of nodes (e.g., using the terms of the nodes in a set of nodes).

Usage of Segments

Segmenting the content item into segments provides, for example, for the indexing, retrieval and distribution of information within content items with greater functionality, accuracy and speed. Such benefits may be realized in a wide variety of ways. For example, having topical labels allows for content items that have been segmented by topic to be searched by topic. In one example, a plurality of portions of one or more content items may be retrieved according to a topic and information based on the retrieved portions may be transmitted to a user device for consumption by a user. In one instance, the retrieved portions of video content items may be transmitted as a continuous video (e.g., a video where all news reporting segments addressing a given topic, across multiple news television programs, are played consecutively in a single stream). In another instance, the retrieved portions may be transmitted as a list that allows a user to select particular portions to view (e.g., a user may view a program guide listing television programs, and identifying different segments within the program, and listing the various programs that have segments addressing a particular topic). The list may include links allowing a user to select one or more of the segments for viewing and/or storing.

In another instance, topical segments of content items may be included as part of another service (e.g., a video-on-demand service, a web and/or Internet service, etc.) that utilizes a topic search function. In yet another instance, portions of content items corresponding to the topic of a content item that is currently being consumed by a user can be retrieved and supplied to the user device. In one such embodiment, the user may indicate their wish to view additional information about a portion of the current content item (e.g., a user may press an appropriate button on a remote control). The associated command may then be communicated to the content supplier which causes a topic for the current content item (e.g., current television program) to be determined (e.g., the topic of the current segment of the current television program). Upon determining the topic of the current content item, other portions of other content items may then be retrieved based on the determined topic and subsequently supplied to the user device for consumption by the user. For example, the user may be watching a television program and the current segment of the television program may be "Eiffel Tower." One or more segments may be retrieved and transmitted to the user having a label that is the same as, or similar to, the "Eiffel Tower." Additionally, the retrieved portions may be transmitted with additional information, such as the topic label, the time-code of the segment's position in the content item, etc. Such additional information may be displayed to a user upon consumption of the segment and/or transmitted information.

In another example, the segmented content items may be used by an advertising system. In one instance, the advertising system may insert advertisements into the content items based on the topics of a content item. In one embodiment, the advertising system may insert an advertisement into the content item near the segment for that topic (e.g., before the segment, after the segment, in a transition between the segment and another segment, etc.). In some arrangements the advertisement may be topically similar to the topic of that segment.

In another example, the topics of the content items transmitted to a user device may be monitored to determine the consumption habits of the user (e.g., determine one or more topics that are often included in content items viewed by the user). Such habit data may be leveraged in various manners. In one instance, topical segments of content items may be transmitted to a user device as a recommendation to that user based on the habit data. In one embodiment, a recommendation may indicate segments of other content items that have one or more topics similar to one or more content items that have been consumed by the user or users having similar consumption habits (e.g., recommendations based on a topic of a content item currently being consumed by the user at the user device, recommendations based on a topic that frequently occurs in consumed content items, etc.). In another instance, the monitored viewing habits may be leveraged by an advertising system (e.g., targeting advertisements to the user based on the viewing habits, etc.).

Although specific examples of carrying out the features above have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
receiving text associated with a content item, the text including a plurality of term strings, each term string including one or more terms;
determining, by a computing device, a set of relevance intervals for a corresponding set of terms in the text, wherein each relevance interval of the set of relevance intervals identifies one or more sections of the content item that are relevant to a corresponding term;
generating a first set of nodes for a first term string from the plurality of term strings, wherein the first set of nodes includes a node for each term in the first term string, and at least one node for a term different from the terms in the first term string but whose corresponding relevance interval includes the first term string;
generating a second set of nodes for a second term string from the plurality of term strings, wherein the second set of nodes includes a node for each term in the second term string, and at least one node for a term different from the terms in the second term string but whose corresponding relevance interval includes the second term string; and
determining a plurality of connections between nodes in the first set of nodes and the second set of nodes, wherein the plurality of connections includes a subset for a first node from the first set of nodes, wherein the subset for the first node includes a connection for each node from the second set of nodes; and
using the first set of nodes, second set of nodes or plurality of connections to identify one or more segment boundaries within the content item.

2. The method of claim 1, wherein each term string of the plurality of term strings is a sentence.

3. The method of claim 1, wherein a first connection of the subset for the first node is a connection strength that includes a contextualized measurement of the relatedness between the first node and a second node in the second set of nodes.

4. The method of claim 1, further comprising:
filtering the plurality of connections based on at least one of a number of connections between the first set of nodes and the second set of nodes, or a cumulative value of connection strengths associated with the plurality of connections.

5. The method of claim 1, further comprising:
determining that a segment boundary occurs between the first set of nodes and the second set of nodes based on the plurality of connections.

6. The method of claim 5, further comprising:
    determining a segment of the content item based on the segment boundary.

7. The method of claim 6, further comprising:
    transmitting information based on the segment of the content item to a user device.

8. The method of claim 6, further comprising:
    determining a topic for the segment of the content item based on at least one of the first set of nodes, the second set of nodes, or the text.

9. The method of claim 8, wherein determining the topic is further based on at least one of a frequency of occurrences of terms in the text or a determined central node based on a term centrality measurement.

10. An apparatus comprising:
    a processor; and
    memory operatively coupled to the processor and storing computer readable instructions that, when executed, cause the apparatus to:
        receive text associated with a content item, the text including a plurality of term strings, each term string including one or more terms;
        determine a set of relevance intervals for a corresponding set of terms in the text, wherein each relevance interval of the set of relevance intervals identifies one or more sections of the content item that are relevant to a corresponding term;
        generate a first set of nodes for a first term string from the plurality of term strings, wherein the first set of nodes includes a node for each term in the first term string, and at least one node for a term different from the terms in the first term string but whose corresponding relevance interval includes the first term string;
        generate a second set of nodes for a second term string from the plurality of term strings, wherein the second set of nodes includes a node for each term in the second term string, and at least one node for a term different from the terms in the second term string but whose corresponding relevance interval includes the second term string; and
        determine a plurality of connections between nodes in the first set of nodes and the second set of nodes, wherein the plurality of connections includes a subset for a first node from the first set of nodes, wherein the subset for the first node includes a connection for each node from the second set of nodes; and
        use the first set of nodes, the second set of nodes or the plurality of connections to identify one or more segment boundaries within the content item.

11. The apparatus of claim 10, wherein a first connection of the subset for the first node is a connection strength that includes a contextualized measurement of the relatedness between the first node and a second node in the second set of nodes.

12. The apparatus of claim 10, wherein the memory further stores computer readable instructions that, when executed, cause the apparatus to:
    filter the plurality of connections based on at least one of a number of connections between the first set of nodes and the second set of nodes, or a cumulative value of connection strengths associated with the plurality of connections.

13. The apparatus of claim 10, wherein the memory further stores computer readable instructions that, when executed, cause the apparatus to:
    determine that a segment boundary occurs between the first set of nodes and the second set of nodes based on the plurality of connections.

14. The apparatus of claim 13, wherein the memory further stores computer readable instructions that, when executed, cause the apparatus to:
    determine a segment of the content item based on the segment boundary.

15. The apparatus of claim 14, wherein the memory further stores computer readable instructions that, when executed, cause the apparatus to:
    transmit information based on the segment of the content item to a user device.

16. The apparatus of claim 14, wherein the memory further stores computer readable instructions that, when executed, cause the apparatus to:
    determine a topic for the segment of the content item based on at least one of the first set of nodes, the second set of nodes, or the text.

17. The apparatus of claim 16, wherein determining the topic is further based on at least one of a frequency of occurrences of terms in the text or a determined central node based on a term centrality measurement.

18. One or more non-transitory computer readable media storing computer readable instructions that, when executed, cause a processor to:
    receive text associated with a content item, the text including a plurality of term strings, each term string including one or more terms;
    determine a set of relevance intervals for a corresponding set of terms in the text, wherein each relevance interval of the set of relevance intervals identifies one or more sections of a content item that are relevant to a corresponding term;
    generate a first set of nodes for a first term string from the plurality of term strings, wherein the first set of nodes includes a node for each term in the first term string, and at least one node for a term different from the terms in the first term string but whose corresponding relevance interval includes the first term string;
    generate a second set of nodes for a second term string from the plurality of term strings, wherein the second set of nodes includes a node for each term in the second term string, and at least one node for a term different from the terms in the second term string but whose corresponding relevance interval includes the second term string; and
    determine a plurality of connections between nodes in the first set of nodes and the second set of nodes, wherein the plurality of connections includes a subset for a first node from the first set of nodes, wherein the subset for the first node includes a connection for each node from the second set of nodes; and
    use the first set of nodes, the second set of nodes or the plurality of connections to identify one or more segment boundaries within the content item.

* * * * *

UNITED STATES PATENT AND TRADEMARK OFFICE
CERTIFICATE OF CORRECTION

PATENT NO. : 8,423,555 B2  
APPLICATION NO. : 12/833486  
DATED : April 16, 2013  
INVENTOR(S) : Geetu Ambwani et al.

Page 1 of 1

It is certified that error appears in the above-identified patent and that said Letters Patent is hereby corrected as shown below:

In the Specification

In Column 17, Line 62:
Please delete "nodes 7070." And insert -- nodes 707f). --

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,423,555 B2 | Page 1 of 1 |
| APPLICATION NO. | : 12/833486 | |
| DATED | : April 16, 2013 | |
| INVENTOR(S) | : Geetu Ambwani et al. | |

It is certified that error appears in the above-identified patent and that said Letters Patent is hereby corrected as shown below:

In the claims,
In Column 24, Claim 18, Line 38:
 Please delete "a content item" and insert --the content item--

Signed and Sealed this
Seventeenth Day of May, 2016

Michelle K. Lee
*Director of the United States Patent and Trademark Office*